United States Patent [19]
Van Vliet

[11] 3,968,888
[45] July 13, 1976

[54] WAREHOUSE SYSEM WITH PARALLEL CONDUCTOR POSITIONAL CONTROL MEANS FOR A STACKER CRANE

[75] Inventor: William George Van Vliet, Greenwich, Conn.

[73] Assignee: The Lummus Company, Bloomfield, N.J.

[22] Filed: Oct. 21, 1968

[21] Appl. No.: 769,012

[52] U.S. Cl............................. 214/16.4 A; 318/601
[51] Int. Cl.² ........................................... B65G 1/06
[58] Field of Search ................ 214/16.4 R, 16.4 A; 318/601, 602

[56] References Cited
UNITED STATES PATENTS

| | | | |
|---|---|---|---|
| 2,823,345 | 2/1958 | Ragland et al.................. | 318/20.310 |
| 2,989,680 | 6/1961 | Welser et al.................... | 318/20.310 |
| 3,049,247 | 8/1962 | Lemelson..................... | 214/16.4 (2) |
| 3,148,785 | 9/1964 | Fauconnier.............. | 214/16.1 (4 D) |
| 3,165,680 | 1/1965 | Morrison ........................ | 318/20.310 |
| 3,239,736 | 3/1966 | Gardberg................... | 318/20.315 X |
| 3,297,379 | 1/1967 | Artaud et al. ............... | 214/16.4 (2) |
| 3,352,978 | 11/1967 | Hartman...................... | 214/16.4 (2) |
| 3,402,836 | 9/1968 | Debrey et al................ | 214/16.4 (2) |
| 3,406,846 | 10/1968 | O'Connor.................... | 214/16.4 (2) |

*Primary Examiner*—Frank E. Werner
*Assistant Examiner*—R. B. Johnson
*Attorney, Agent, or Firm*—Marn & Jangarathis

[57] ABSTRACT

Automatic warehouse apparatus is provided according to the present invention wherein a digital remote control system is relied upon to control the operations of a remote stacker adapted to pick-up and deposit loads at a support containing a plurality of discrete storage locations. According to one embodiment of the present invention a support containing a plurality of adjacent columns of storage locations is provided with a plurality of electrical conductors in a manner such that each of the plurality of electrical conductors has a portion from which electrical information applied to that conductor may be derived positioned in relation to an individual one of such plurality of adjacent columns of storage locations whereby one of the plurality of electrical conductors is associated with each column of storage locations. Carrier information signals serving to designate each of the plurality of electrical conductors and hence the column of storage locations associated therewith are applied to the plurality of electrical conductors from a central control console according to a predetermined digital code and a remote stacker movable in front of the plurality of adjacent columns of storage locations is adapted to derive carrier information signals including at least a signal designating a selected one of the plurality of columns of storage locations from the aforesaid portions of individual ones of the plurality of electrical conductors. Additional carrier information signals including at least a signal designating a selected one of the plurality of columns of adjacent storage locations and the operation to be performed are also applied to the remote stacker from the control console. The remote stacker is provided with a device for comparing signals designating a selected one of the plurality of columns with carrier information signals derived from the portions of the individual ones of the plurality of electrical conductors and designating the column of storage locations associated therewith whereby the motion of the remote stacker may be stopped in front of the selected column of storage locations and the desired operation performed.

6 Claims, 18 Drawing Figures

INVENTOR.
W. George Van Vliet

INVENTOR.
W. George Van Vliet

BY

Mann & Jangarathis

ATTORNEYS

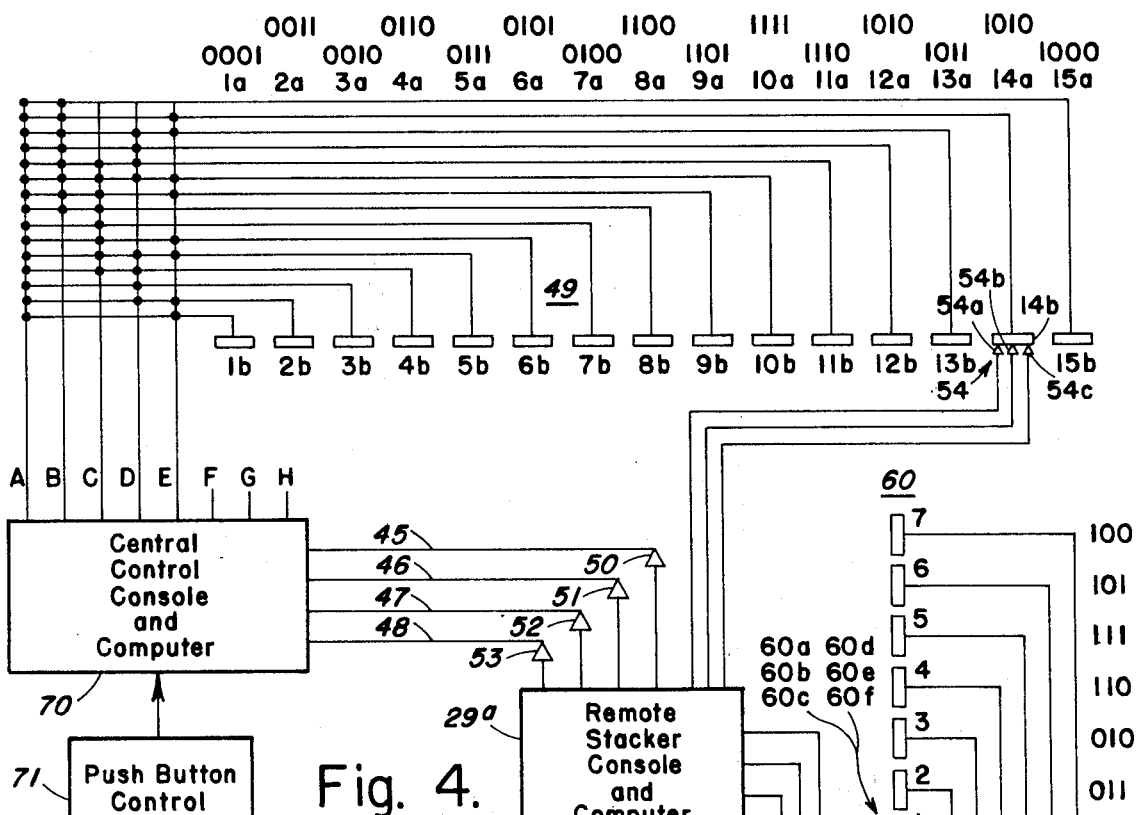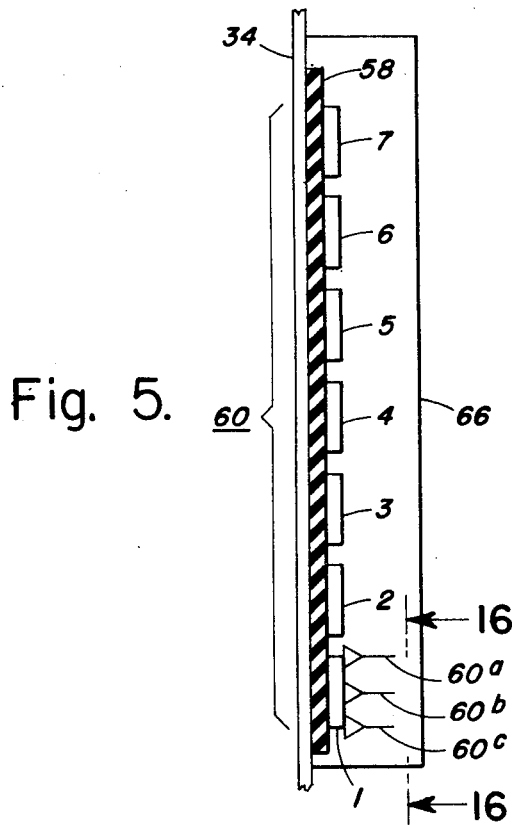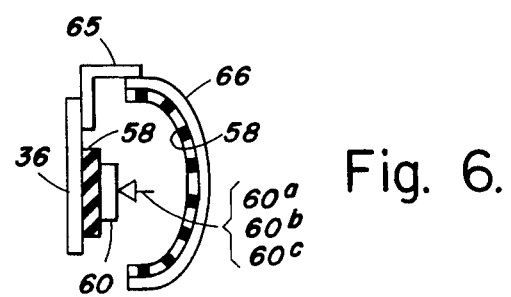

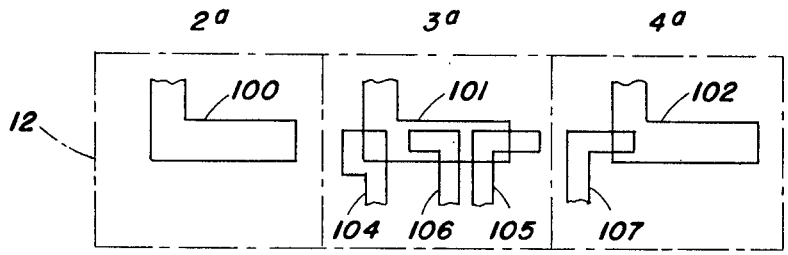
Fig. 10.
| Carrier Current Freq. in C.P.S. | Alphabet. Designation | Command Signal Ident. |
|---|---|---|
| 1400 | O | Guard Outgoing |
| 1600 | I | Guard Incoming |
| 1800 | A | Guard X-Movement |
| 2000 | J | Guard Y-Movement |
| 2200 | P | Guard Z-Movement |
| 2400 | S | Guard Operational |
| 2600 | B | X-Movement |
| 2800 | C | |
| 3000 | D | |
| 3200 | E | |
| 3400 | F | Spare X-Movement |
| 3600 | G | |
| 3800 | H | |
| 4000 | K | Y-Movement |
| 4200 | L | |
| 4400 | M | |
| 4600 | N | Spare Y-Movement |
| 4800 | Q | Z-Movement |
| 5000 | R | |
| 5200 | T | Operational Signals |
| 5400 | U | |
| 5600 | V | |
| 5800 | W | |
| 6000 | # | |
Fig. 7.
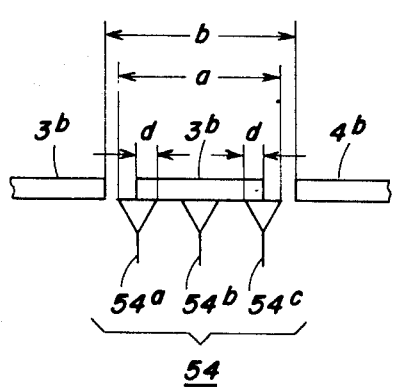
Fig. 9.
INVENTOR.
W. George Van Vliet
BY
Mann & Jangarathis
ATTORNEYS

Fig. 11.

| Column of Storing Spaces in Figs. 2 & 4 | Positions in Gray Code | | | |
|---|---|---|---|---|
| | $(2^4-1)$ 15 | $(2^3-1)$ 7 | $(2^2-1)$ 3 | $(2^1-1)$ 1 |
| 1a | 0 | 0 | 0 | 1 |
| 2a | 0 | 0 | 1 | 1 |
| 3a | 0 | 0 | 1 | 1 |
| 4a | 0 | 1 | 1 | 0 |
| 5a | 0 | 1 | 1 | 1 |
| 6a | 0 | 1 | 0 | 1 |
| 7a | 0 | 1 | 0 | 0 |
| 8a | 1 | 1 | 0 | 0 |
| 9a | 1 | 1 | 0 | 1 |
| 10a | 1 | 1 | 1 | 1 |
| 11a | 1 | 1 | 1 | 0 |
| 12a | 1 | 0 | 1 | 0 |
| 13a | 1 | 0 | 1 | 1 |
| 14a | 1 | 0 | 0 | 1 |
| 15a | 1 | 0 | 0 | 0 |

Fig. 12.

| Horizontal Rows of Storing Spaces in Figs. 2 & 4 | Positions in Gray Code | | |
|---|---|---|---|
| | $(2^3-1)$ 7 | $(2^2-1)$ 3 | $(2^1-1)$ 1 |
| 1 | 0 | 0 | 1 |
| 2 | 0 | 1 | 1 |
| 3 | 0 | 1 | 0 |
| 4 | 1 | 1 | 0 |
| 5 | 1 | 1 | 1 |
| 6 | 1 | 0 | 1 |
| 7 | 1 | 0 | 0 |

Fig. 14.

| Operational Commands from Central Console Computer 70 to | Positions in Gray Code | |
|---|---|---|
| | $(2^2-1)$ 3 | $(2^1-1)$ 1 |
| Stacker Computer 29a | 3 | 1 |
| Is Stacker empty? | 1 | 0 |
| Is Fork 43 in normal retracted Position? | 0 | 1 |

Fig. 13.

| Z-Movement of Fork 43 on Carriage 40 in Fig. 1. | Positions in Gray Code | |
|---|---|---|
| | $(2^2-1)$ 3 | $(2^1-1)$ 1 |
| In | 0 | 1 |
| Out | 1 | 1 |

INVENTOR.
W. George Van Vliet

BY

Mann & Jangarathis
ATTORNEYS

Fig. 15.
| Operational Commands from Stacker Computer 29a to Central Computer 70 | Positions in Gray Code | | |
|---|---|---|---|
| | $(2^3-1)$ 7 | $(2^2-1)$ 3 | $(2^1-1)$ 1 |
| Stacker empty | 0 | 0 | 1 |
| Load on Stacker | 0 | 1 | 1 |
| Malfunction | 0 | 1 | 0 |
| Space empty | 1 | 1 | 0 |
| Space full | 1 | 1 | 1 |
| Power on Stacker | 1 | 0 | 1 |
| Ready | 1 | 0 | 0 |
Fig. 16.
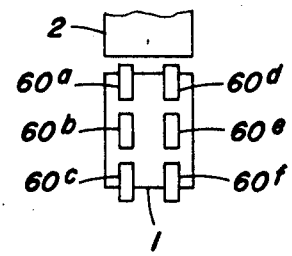
Fig. 17.
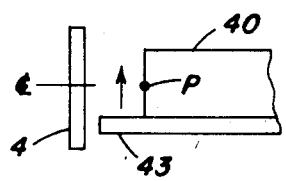
Fig. 18.
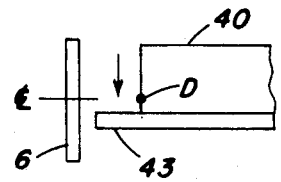
INVENTOR.
W. George Van Vliet
BY
*Mann & Jangarathis*
ATTORNEYS

WAREHOUSE SYSEM WITH PARALLEL CONDUCTOR POSITIONAL CONTROL MEANS FOR A STACKER CRANE

This invention relates to a digital remote control system for automating warehouse apparatus to retrieve loads from preselected storing spaces or to deposit loads therein, and more specifically to an improved control system for initially providing digital signals which are subsequently converted into carrier current Gray code signals transmitted between a fixed central control console and a remote load stacker console to control movements of a stacker and a load handling fork for picking up loads from preselected storing spaces or depositing loads therein. The stacker remains at the address at which its last assignment was completed until a new address and a new assignment are supplied thereto from the central console, and is adapted to transmit carrier current Gray code operational signals to the central console as well as to receive such signals therefrom.

Automatic warehouse apparatus is known in the art for retrieving from or depositing loads in preselected load storing spaces disposed at different levels along an aisle of load storing spaces. The loads are usually retrieved from or placed in the respective storing spaces via floor or overhead cranes automatically controlled by data equipment or the like. In one prior art system, a load stacker receives its command instructions at a home base as to load retrieval or deposit at a particular address for each half-cycle of operation and is required to return to its home base for each new command instruction and new address for each succeeding half-cycle of operation. This entails unnecessary wear and tear on the apparatus, and limits the number of load handling operations by the stacker in a given time period. Once the stacker leaves the home base with one command instruction and one address, the stacker has no further communication with the home base until it returns for a new command instruction and a new address. In another type of prior art system, an umbilical multiconductor cable connects the moving stacker with its home base for transmitting command and address signals therebetween. This cable was found to be expensive to install, troublesome to maintain, a limitation on the range of the guiding track, and a limitation on the movements of the stacker.

The present invention contemplates an improved automatic control system for continuously interchanging command instructions, addresses and check signals in the form of different carrier current Gray codes between a fixed control console and a remote load stacker to control the movements of a load stacker in its load retrievals or disposals at preselected addresses with optimum reliability and for obviating a need of a home base for the stacker. This improved control system enables the stacker to remain at the address of its last completed assignment until a new command signal, including a new assignment and a new address is received thereat. In accordance with the improved control system, the stacker has no home base.

A principal object of the present invention is to provide improved reliability in the transmission of operational signals between a fixed central control point and a remote movable point in an automatic warehouse apparatus.

Another object is to transmit continuously operational carrier current Gray code signals from a central control console to a remote movable stacker.

A further object is to transmit operational signals in the form of carrier current Gray code signals.

Still another object is to improve the reliability of operation of an automatic warehouse apparatus.

An additional object is to check the accuracy of operational signals at a remote point before the execution of such signals thereat.

Still an additional object is to report back to a central control point each operation performed at a remote point.

Another object is to control the deceleration of a load stacker upon reaching a predetermined column of load storing spaces.

A further object is to control the deceleration of a loading fork carriage upon reaching a predetermined horizontal row of load storing spaces.

A still further object is to display instantly at a central control point operational information received thereat from a remote point.

Another object is to provide an automatic warehouse apparatus expeditiously adaptable to include additional load storing spaces with substantially minimal difficulty.

An additional object is to provide an improved warehouse apparatus for continuously converting digital code signals into carrier current Gray code signals.

A further object is to feed back to a central control point instruction signals received at a remote point for comparison with the instruction signals originated at the central control point.

In association with an automatic warehouse apparatus including a central control point, a remote load stacker movable on a fixed track and including a carriage having an extensible and retractable load handling fork, and three electric motors on the stacker and carriage for providing X-horizontal, Y-vertical and z-transverse movements of the stacker, carriage and fork, respectively, for retrieving loads from preselected storing spaces or depositing loads therein in response to suitable operational signals, a specific embodiment of the present invention comprises a central control console for generating a plurality of discrete carrier currents, a digital push button panel at the central console including a computer for generating digital codes, a first multi-conductor cable disposed horizontally adjacent to a plurality of columns of the load storing spaces having individual ones of the conductors therein. located opposite selected ones of said column of storing spaces a group of continuous electric conductors interconnecting the central console and a console and computer mounted on the stacker for transmitting operational and check signals therebetween, and a second multi-conductor cable positioned vertically on the stacker respective ones of said latter conductor positioned opposite selected ones of said horizontal rows of storing spaces.

In the operation of the specific embodiment of the present invention, storing spaces for load retrieval or deposit are preselected by push button digital codes which are converted by the central console computer into preselected mult-element carrier current Gray code signals, i.e., the carrier currents are positioned in the 1-digit positions of the Gray codes. A first plurality of 4-element carrier current Gray code signals generated at the central console computer is applied continuously to the horizontally disposed multi-conductor cable, each conductor therein receiving a different 4-element carrier current Gray code signal for enabling an identification of such conductor and thereby an identification of the corresponding storing space column; and at the same time one of a plurality of different command 4-element carrier current Gray code signals identifying a preselected horizontal conductor within said cable and thereby a preselected storing space column is continuously applied by the central stacker computer to a first two of the continuous conductors to the stacker console computer. A first group of electric shoes mounted on the stacker and slidably engaging respective ones of the conductors within the horizontally disposed multi-conductor cables pick up the identifying 4-element carrier current Gray code signals effective thereon for application to the stacker console computer. This computer compares the command 4-element carrier current Gray code signal identifying the preselected storing space column with the 4-element carrier current Gray code signals picked up from the successive horizontal conductors present within the horizontally disposed multi-conductor cable by the first shoe group to produce a negative or a positive number which is obtained by subtracting the number of the storing space column at which the stacker is initially positioned from the number of the storing space column to which the stacker is commanded to go as a new address. As, for example, the stacker is assumed to be initially located in front of storing space 141 (i.e., in front of column 14 and horizontal row 1), and is now commanded to go to storing space 34 (i.e., column 3 and horizontal row 4), the stacker computer subtracts 14 from 3, in accordance with a predetermined circuit design technique of subtracting the present address column number 14 from the new address column number 3 to which the stacker is now commanded to go, to provide a negative difference number. If the reverse were the fact, i.e., the stacker were initially positioned at storing space column 3 and commanded to go to storing space column 14, then the stacker computer would subtract the latter number 3 from the latter number 14 to provide a positive difference number.

The negative difference number obtained by subtracting the number 14 from the number 3 as just mentioned causes the stacker computer to energize the first electric motor with such voltage polarity as to move the stacker in the X-direction to the left of storing space column 14 until the carrier current Gray code signal picked up from horizontal conductor within the multi-conductor cable for example, is identical with the command carrier current Gray code signal identifying conductor 3. As this computer is now subtracting the number 3 from the number 3, it provides a zero difference number. This causes the stacker computer to terminate the energization of the first motor thereby stopping the stacker in front of column 3. It is to be noted that if the stacker computer subtracted the last mentioned number 3 from the last mentioned number 14 to produce the afore-stated positive difference number, for example, then this positive number would cause the stacker computer to energize the first electric motor with such voltage polarity as to move the stacker in the X-direction to the right of storing space column 14 in accordance with the abovementioned predetermined technique.

During this time, a second plurality of 3-element carrier current Gray code signals generated at the central console computer in response to the digital pushbutton code is continuously applied via the first two continuous conductors to the vertically disposed multi-conductor cable mounted on the stacker in a manner such that each conductor therein receives a different 3-element carrier current Gray code signal for enabling an identification of such conductor and thereby an identification of the corresponding horizontal row of storing spaces. At the same time, one of a plurality of different command 3-element carrier current Gray code signals identifying a preselected vertical conductor within the multi-conductor cable and thereby a preselected horizontal row of storing spaces is continuously applied by the central console computer via the first two continuous conductors to the stacker console computer. Second and third groups of electric shoes fixedly mounted on the stacker and activated one group at a time to slidably engage the respective vertical conductors within the vertically disposed multi-conductor cable picks up the identifying 3-element carrier current Gray code signals effective thereon for application to the stacker console computer. For example, the second shoe group is activated during a load pick-up operation while the third shoe group is inactive or the third shoe group is activated during a load deposit operation while the second shoe group is inactive. The second shoe group serves to position a first predetermined point on the carriage approximately at a horizontal midpoint of each vertical conductor within the vertically disposed multiconductor cable in turn and the third shoe group serves to position a second predetermined point on the carriage approximately at the latter midpoint of each vertical conductor within the multi-conductor cable in turn. Thus, the second shoe group serves to dispose the first predetermined carriage point so that the load handling fork is below the load positioned in a preselected storing space, while the third shoe group serves to dispose the second predetermined carriage point so that the load handling fork is above suitable members positioned in the preselected storing space to receive a load carried by the latter fork.

The stacker computer compares the command 3-element carrier current Gray code signal identifying the preselected storing space horizontal row with the successive 3-element carrier current Gray code signals picked up by one of the second and third shoe groups from the successive vertical conductors within the multi-conductor cable to produce a negative, a positive or a zero difference number which is derived by subtracting the number of the storing space horizontal row at which the stacker is initially positioned from the number of the storing space horizontal row to which the stacker is commanded to go as a new address.

As the stacker is assumed to be initially located in front of storing space 141, and is presently commanded to go to storing space 34, this means that the carriage carrying the load handling fork is initially positioned in front of storing space horizontal row 1 and the carriage is commanded to move up to storing space horizontal row 4. Now, the stacker console computer subtracts the number 1 from the number 4, in accordance with the predetermined circuit design technique of substracting the present address horizontal row number 1 from the new address horizontal row number 4 to which the carriage is commanded to go, to provide a positive difference number. If the reverse were the fact, i.e., the carriage were initially positioned at storing space horizontal row 4 and commanded to go to storing space horizontal row 1, then the stacker console computer would subtract the latter number 4 from the latter number 1 to produce a negative difference number.

The positive difference number derived by subtracting the number 1 from the number 4 as just mentioned causes the stacker console computer to energize a second electric motor with such voltage polarity as to move the carriage in the Y-direction up from storing space horizontal row 1 toward storing space horizontal row 4 until the carrier current Gray code signal picked up at vertical conductor 4 within the multi-conductor cable is identical with the transmitted command carrier current Gray code signal identifying vertical conductor 4. As the stacker computer is now subtracting the number 4 from the number 4 at the moment, it provides a zero difference number. This causes the stacker computer to terminate the energization of the second motor thereby stopping the first or second predetermined point on the carriage in front of the midpoint of conductor 4 of the multi-conductor cable and thereby in front of storing space horizontal row 4, depending upon whether the operation is a pick up or a deposit at the moment. Thus, the carriage is now positioned in front of storing space 34. It is noted that if the stacker computer subtracted the last-mentioned number 4 from the last-mentioned number 1, then this negative difference number would cause the stacker computer to energize the second motor with such voltage polarity as to move the carriage in the Y-direction down from storing space horizontal row 4 to storing space horizontal row 1 in accordance with aforementioned predetermined technique.

As the first predetermined point initially positions load handling fork below a pallet carrying a load in a preselected storing space 34 and scheduled for retrieval, a second 2-element Gray code signal causes the stacker computer to energize the third motor in such a manner as to extend the empty load handling in the Z-transverse direction from a normal position on the carriage into the interior of the preselected storing space. Due to an initial load pick up operation initiated at the central console, the stacker computer is programmed to supply operating voltage to the second motor which moves the carriage up in the Y-direction to cause the fork to engage the under surface of the pallet for lifting the pallet and load thereon clear of the members upon which the pallet was resting. Now, a different second 2-element Gray code signal causes the stacker computer to energize the third motor in such manner as to retract the load handling fork carrying the pallet and load thereon in the Z-transverse direction from the interior of the preselected storing space back to carriage. Due to the initial load pick up operation, the stacker computer is programmed to energize the second motor to move the carriage down in the Y-direction to its normal position thereon.

An actuation of a deposit push button and appropriate other digital push buttons providing a new address for the pallet and load thereon serves to activate the central and stacker computers in a manner similar to the afore-explained pick up operating half-cycle for moving the stacker, carriage and load handling fork including the pallet and load thereon from the present address of load storing space 34 to a new address say, for example, load storing space 126 in which the pallet and load thereon are deposited in the deposit operating half-cycle. Additional carrier currents positioned in the 1-digit positions of other Gray code signals effect additional predetermined operational functions at the central and stacker consoles. Specific arrangements are included to control the full and decelerating speeds of the first and second motors in the X and Y-directions, respectively.

A feature of the invention is the continuous generation of carrier current Gray code signals at a central console computer and the transmission of such signals to a load storing space support and a stacker console computer for identifying each column and each horizontal row of load storing spaces together with command carrier current Gray code signals for moving the stacker and carriage thereon from present addresses to new addresses until the stacker console has fully responded to the respective command signals. Another feature involves a use of only four continuous electric conductors fixed in position and engaged by electric signal pick up shoes slidable thereon for continuously communicating carrier current Gray code signals between the central and stacker console computers. Still another feature concerns an automatic check of command carrier code signals whereby all latter signals originating at the central console are checked at the stacker console before their execution thereat. Another feature relates to an automatic reporting by the stacker console to the central console of all operations performed by the stacker console. An additional feature is the immediate visual display at the central console of operational movements of the remote stacker. Still an additional feature involves a simplicity in design whereby the number of storing spaces may be expeditiously decreased or increased with respect to a given number thereof with substantially minimum technical difficulty. A further feature concerns a use of multiconductor cables horizontally and vertically positioned for identifying columns and rows, respectively, of load storing spaces, each horizontally positioned conductor within a multi-conductor cable serving to identify one column of load storing spaces and each vertically positioned conductor within a multi-conductor cable serving to identify one row of load storing spaces. Another feature relates to the automatic deceleration of the stacker and carriage speed as predetermined distances from preselected stopping positions are attained. Still another feature is the translation of digital code signals into carrier current Gray code signals. Another feature relates to the use of two groups of pick-up shoes for aiding in the identification of each storing space horizontal row, one shoe group used for a load pick-up and the other for a load deposit.

The invention is readily understood from the following description taken together with the accompanying drawing in which:

FIG. 4 is a schematic diagram showing electrical connections and components included in the specific embodiment of the invention in FIGS. 1, 2 and 3;

FIG. 5 is an end elevational view taken along line 5—5 in FIG. 6;

FIG. 6 is a plan view taken along line 6—6 in FIG. 1;

FIG. 7 is a table showing discrete carrier currents generated in FIG. 4;

FIG. 9 is a fragmentary plan view of a plurality of horizontally positioned conductors within the horizontally disposed multi-conductor cable as shown in FIG. 4;

FIG. 10 is a partial circuit diagram showing a modification of the invention as usable in FIGS. 1, 2 and 4;

FIG. 11 is a 4-element Gray code table indicating Gray code assignments for achieving the X-movements to locate the respective columns of load storing spaces in FIGS. 2 and 4;

FIG. 12 is a 3-element Gray code table showing Gray code assignments for achieving the Y-movements to locate the respective horizontal rows of load storing spaces in FIGS. 2 and 4;

FIG. 13 is a 2-element Gray code table illustrating Gray code assignments for achieving the respective Z-movements of the load handling fork in FIG. 1;

FIG. 14 is a 2-element Gray code table indicating the Gray code assignments for achieving operational signaling from the central console to the stacker console in FIGS. 1 and 4;

FIG. 15 is a 3-element Gray code table showing the Gray code assignments for achieving operational signaling from the stacker computer to the central computer in FIGS. 1 and 4;

FIG. 16 is a partial elevational view taken along line 16—16 in FIG. 5; and

FIGS. 17 and 18 are partial end elevational views looking at the carriage at the lowermost end of the stacker in FIG. 1 and showing different initial stopping points of the carriage in response to pick-up and deposit operations, respectively, in FIGS. 1, 2 and 4.

Figure 1:
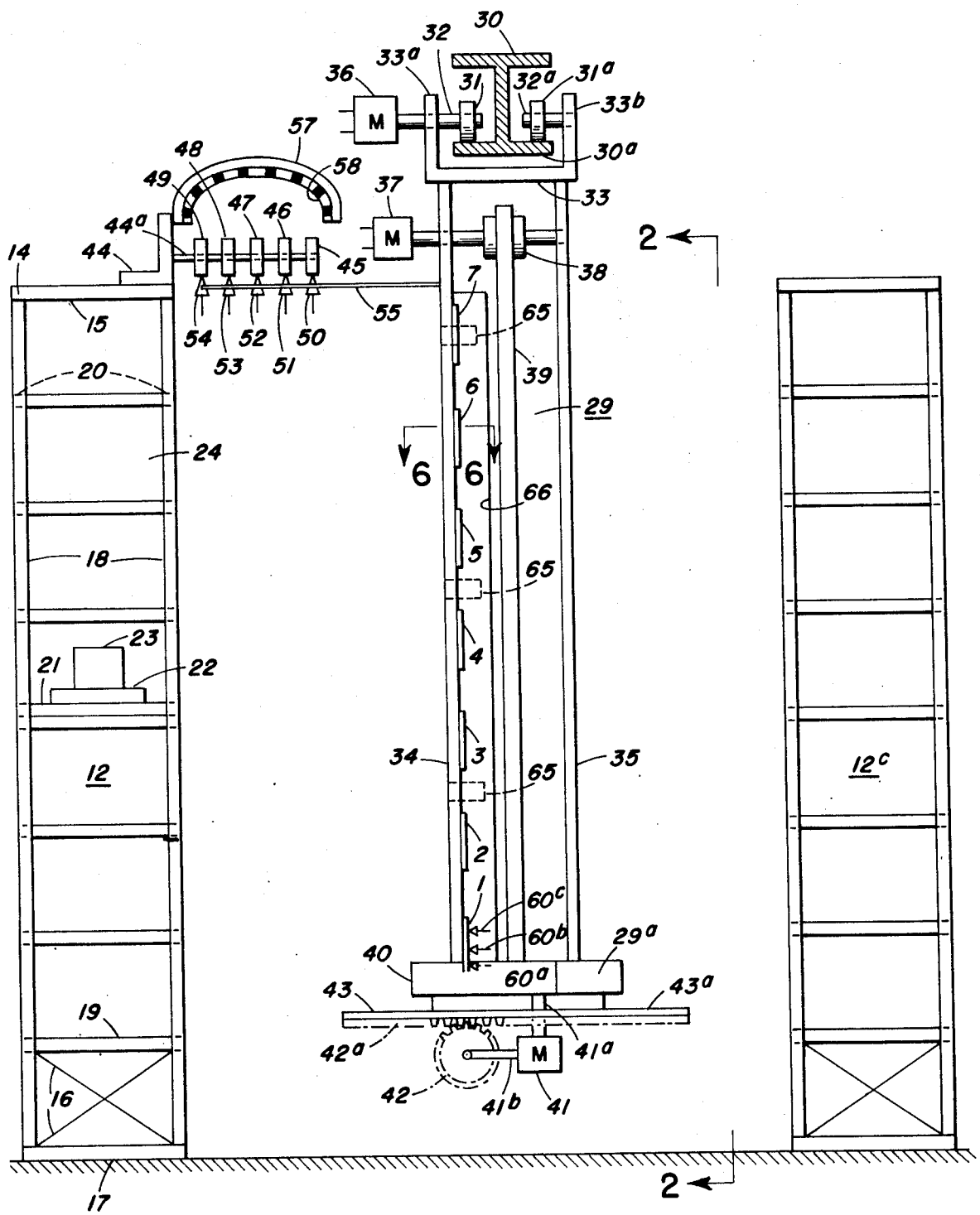
FIG. 1 is an end elevational view of left hand and right hand groups of load storing spaces in an automatic warehouse apparatus including a specific embodiment of the present invention.
Figure 2:
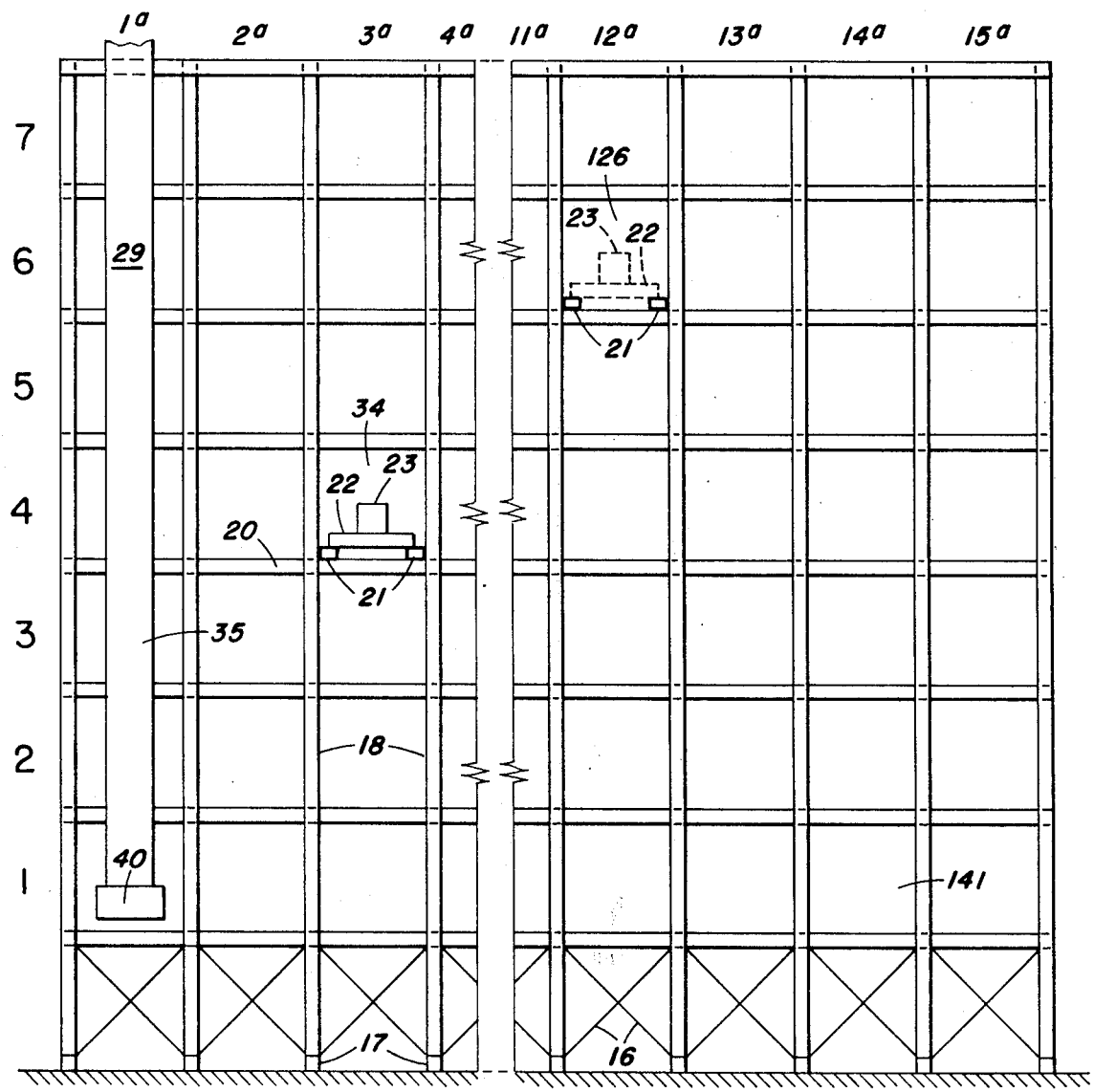
FIG. 2 is a partial side elevational view taken along line 2—2 in FIG. 1.

FIGS. 1 and 2 show a load storing warehouse apparatus including support 12 embodying fifteen columns and seven horizontal rows, for example, of load storing spaces 24 of uniform dimensions and positioned on a structure 16 which comprises a well-known type and is mounted on spaced floor members 17 for elevating the support above the floor. The support includes a plurality of rows of posts 18 uniformly spaced and vertically mounted on the floor members. The uppermost ends of the posts are interconnected by parallel longitudinal members 14 and parallel transverse members 15. The posts and the top longitudinal and transverse members are connected together by a plurality of transverse side members 19 and horizontal front and rear members 20 to give steadiness to the support. Each loading space is common to one column and one row. Obviously, the number of columns and rows may be increased or decreased as desired, and may be easily modified to provide storing spaces of different dimensions. Rectangular members 21 transversely mounted in spaced relation on front and rear members 20 in each storing space support a pallet 22 on which a load 23 is positioned. The pallet and load are shown in preselected storing space 34 located in column 3 and row 4 for an objective that is subsequently mentioned. It is understood that for the purpose of this description the storing spaces accommodate loads of uniform bulk and weight, i.e., loads of common dimensions. It is also understood that a right hand load support 12c is identical with and positioned opposite to left hand load support 12, so that corresponding load storing spaces in the respective load supports are precisely, oppositely disposed for a purpose that is later explained.

An overhead I-beam guide track 30 extending horizontally along and above load storing space supports 12 and 12c and spaced equidistantly from and in parallel relation with front vertical planes of the respective supports has a length at least coextensive with the lengths thereof. The track is rigidly mounted in the above-described position in a suitable manner, not shown. Roller 31 is fixedly attached to one end of a shaft 32 which is rotatably mounted in vertical leg 33a of a U-shape member 33 and which has its opposite end joined to a rotor, not shown, included in electric motor 36. An idler roller 31a is rotatably mounted on a shaft 32a fixedly secured to vertical leg 33b of the U-shape member. Rollers 31 and 31a ride on upper surfaces of the I-beam track lower flange 30a.

An elongated load stacker 29 includes spaced elongated members 34 and 35 normally depending in parallel from and suitably secured to a lowermost horizontal surface of the U-shape member. Each elongated member has its outer surface of maximum dimension disposed in parallel with the front vertical plane of the nearest storing space support. Motor 36 in FIGS. 1 and 3 actuating shaft 32 moves the stacker back and forth on the guide track in opposite X-horizontal directions in response to the directional rotation of the shaft at a given time. This direction of rotation, i.e., clockwise or counterclockwise, is controlled at the given moment by suitable control signals provided in a manner and for a purpose that are hereinbelow explained.

Figure 3:
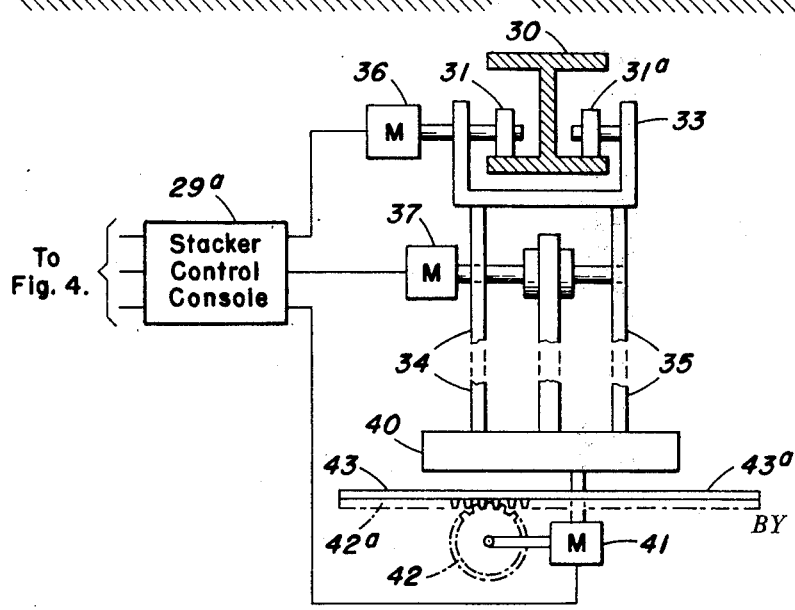
FIG. 3 is a fragmentary end elevational view looking into FIG. 1 and including electrical connections extending between several electric motors therein and a remotely located stacker control console.

Motor 37 in FIGS. 1 and 3 mounted on the outer surface of maximum dimension of elongated member 34 drives a sprocket 38 and thereby a chain 39 engaged therewith in a conventional manner. This serves to elevate or lower carriage 40 in front of the storing spaces of the respective storing space supports in opposite Y-directions which are normal to the X-horizontal directions of movement of the stacker. The carriage is guided in its Y-direction movements via a suitable means, not shown. It is obvious that a drum and a cable rolled thereon, not shown, or the like familiar to the art may replace the sprocket and chain, as desired.

Motor 41 suitably mounted on a bracket 41a attached to the under-structure of the carriage has its rotor connected to one end of a shaft 41b which has its opposite end adapted to mount a pinion gear 42 engaging the teeth of a rack 42a of a telescoping type, for example. A load handling fork 43 of familiar structure fastened to a left hand end of the rack and disposed in a normal position on the carriage is extensible via rack 42a and motor 41 in Z-directions transverse to the vertical movements of the carriage to predetermined position in the interiors of the respective storing spaces in load support 12, and is retractable therefrom via rack 42a and motor 41 in an opposite Z-direction transverse to the vertical movements of the carriage to its normal position on the carriage. The direction of rotation, i.e., clockwise or counterclockwise of motor shaft 41b is controlled at a given moment by suitable control signals supplied to motor 41 in a manner and for a purpose that are subsequently mentioned.

It is thus apparent in FIGS. 1, 2 and 3 that motor 36 may be controlled to move the stacker in an X-horizontal direction back and forth in front of the storing spaces in the storing space support 12 until a preselected column of storing spaces therein is reached; motor 37 may be controlled to elevate or lower the carriage on the stacker in a Y-vertical direction in front of the preselected column of storing spaces in support 12 until a preselected horizontal row of storing spaces therein is reached; and motor 41 may be controlled to move the load handling fork 43 in opposite Z-transverse directions for extending the latter fork into a particular storing space identified by the latter preselected column and row of storing spaces and to retract the latter fork from such particular storing space. It is further apparent that such control of the respective motors may be utilized to deposit loads in preselected storing spaces in support 12 or to retrieve loads therefrom in a manner that is mentioned hereinbelow. For the purpose of this description, it is assumed that the load storing space support 12 is FIGS. 1 and 2 contains fifteen columns of load storing spaces numbered 1a through 15a, commencing at the left in FIG. 2, and seven horizontal rows of load storing spaces numbered 1 through 7, commencing with the storing space loacted nearest to the floor, i.e., a total of one hundred and five load storing spaces. It is understood that a right hand load support 12c is a duplicate of load support 12 and motors 36, 37 and 41 may be so controlled as to extend and retract right hand loading fork 43a in the manner of loading fork 43 for depositing loads in the respective storing spaces in support 12c or to retrieve loads therefrom in a manner that is subsequently explained.

FIGS. 1 and 4 show angle iron 44 having a horizontal leg horizontally mounted on the top of load storing space support 12 and extending coextensively therewith; four continuous electric conductors 45, 46, 47 and 48 fixedly mounted in spaced parallel relation on one or more bars 44a extending transversely from the vertical leg of the angle iron in the area between the angle iron and guide track are coextensive in length therewith; and a fifth multi-conductor cable 49 attached to transverse bars 44a and including fifteen discrete conductor 1b through 15b arranged in spaced relation in single file between angle iron 44 and adjacent conductor 48. Each of the fifteen conductors within multi-conductor cable 49 has its midpoint disposed opposite to a midpoint of one column of storing spaces in support 12 and a length slightly less than the width of the corresponding storing space for a purpose that is later mentioned. Thus, conductor segments 1b through 15b serve to represent the storing space columns 1a through 15a, respectively, in support 12 and are disposed with equal amounts of spacing between adjacent ends thereof. It is apparent that multi-conductor cable 49 is mounted in parallel relation with conductor 48. Each of bars 44a has one end fixedly mounted in the angle iron to extend transversely therefrom and its opposite end supporting the electric conductors just identified. It is understood that electric conductors 45 through 49 are suitably electrically insulated from mounting bars 44a, as well as from each other, and that mounting bar 44a represents a quantity that may be required in a given installation. As load support 12c is a duplicate of load support 12, it is evident that conductors 1b through 15b could also represent storing space columns 1a through 15a, respectively, in load support 12c for a purpose that is later explained.

Electric pick-up shoes 50, 51, 52, 53 and 54 slidably engaging conductors 45, 46, 47, 48 and 49, respectively, in FIG. 1 are suitably mounted in spaced relation on a free end of transverse bar 55 which has its opposite end suitably secured to elongated member 34. Actually, shoe 54 represents a first group of three pick-up shoes 54a, 54b and 54c shown in FIGS. 4 and 9 for a purpose that is later mentioned. It is understood that the several pick-up shoes are suitably electrically insulated from bar 55, as well as from each other. A semi-circular elongated housing 57 having one end suitably fastened to an uppermost edge of the vertical leg of angle iron 44 in FIG. 1 and lined interiorly with electric insulation 58 is disposed above the respective conductors and pick-up shoes to minimize physical damage and the possibility of short circuits thereto. It is apparent from the foregoing description that the pick-up shoes are moved in the X-horizontal direction with the stacker, and that bar 55 represents a quantity that may be required for a given installation.

FIGS. 1, 4, 5 and 16 delineate a second multi-conductor cable 60 formed of a plurality of vertically aligned conductors comprising seven in number and having equal lengths and spacings between adjacent ends for the purpose of this explanation. Each conductor within cable 60 has a length which is slightly less than the height of each load storing space and a midpoint positioned opposite to a midpoint of one horizontal row of laod storing spaces in load support 12 on electric insulation 58 attached to the inside surface of elongated member 34 as illustrated in FIG. 1. The conductors are numbered 1 through 7, commencing with the row of load storing spaces nearest to the floor. Thus, each conductor within the multi-conductor cable 60 serves to identify one horizontal row of load storing spaces in load support 12 in a manner and for a purpose that are mentioned hereinafter. Second and third groups of electric pick-up shoes 60a, 60b and 60c and 60d, 60e and 60f, respectively, are suitably mounted in vertical and horizontal alignment on carriage 40 for slidable engagement with the respective vertical segments 1 through 7 as carriage 40 is actuated thereby in opposite Y-vertical directions as further explained hereinafter. It is obvious that each of the conductor 1 through 7 may also represent one horizontal row of storing spaces in load support 12c for a purpose that is stated later.

FIGS. 1, 5 and 6 illustrate a plurality of spaced angle brackets 65 each having one leg attached to a vertical, inside edge of elongated member 34 and the other leg secured to a vertical edge of a semi-circular elongated housing 66 lined on its interior surface with electric insulation material 58 for supporting the latter housing in proximity of the second multi-conductor cable 60. This housing partially encloses the second multi-conductor cable 60 and the second and third groups of pick-up shoes 60a, 60b and 60c and 60d, 60e and 60f slidably engaged therewith as shown in FIGS. 4 and 16 in order to minimize physical damage and the possibility of short circuits to the respective conductors 1-7 of the multi-conductor cable 60 and the pick-up shoes.

In accordance with a specific embodiment of the present invention, an improved digital control system is provided to automate the aforedescribed warehouse apparatus for retrieving loads from preselected load storing spaces or depositing loads therein in a manner that is presently explained. For the purpose of simplifying this explanation, the improved control system is described with reference only to load support 12. It is to be understood, however, that the improved control system may be slightly modified for operation to embrace both load supports 12 and 12c in a manner that is hereinafter mentioned. Thus, the specific embodiment of the present invention included in an automatic warehouse apparatus provides a digital system for continuously controlling the load retrieval and the load disposals at a remote point by the operation of digital equipment located at a central control point remote from the load supports.

The general principle of the improved control system in accordance with the specific embodiment of the invention provides all information required to operate the stacker in its movements to retrieve or deposit loads in preselected load storing spaces in terms of a reflected binary code known as the Gray code. As is well-known, this code may be described by two rules: (1) the significance of the digits is equal to a straight binary code minus one; thus the digits have the positional representations 1, 3, 7, 15, 31, 63, etc. as is well-known in the art; and (2) all 1 digits have alternate positive and negative valves starting with a positive sign for the most significant 1 digit as shown in the left hand position of the series 01 (+)1(−)1(+)[(+7) (−3) (+1)=5] in FIG. 11 for identifying column 5 or horizontal row 5, for example, as explained later. In accordance with the Gray code, each of the columns of load storing spaces in FIGS. 2 and 4 is identified as indicated in FIGS. 4 and 11.

Referring to FIGS. 4, 7 and 11, signals of different carrier current frequencies are assigned to represent the 1 digits in different positions in the Gray code for each of the X, Y and Z-direction movements of the load stacker as previously explained. For example, in FIGS. 4, 7 and 11, a 2600 cycle-per-second carrier current B is assigned to represent a 1 digit in the No. 15 position of a 4-element Gray code, a 2800 cycle-per-second carrier current C is assigned to represent a 1 digit in the No. 7 position of the Gray code, a 3000 cycle-per-second carrier current D is assigned to represent a 1 digit in the No. 3 position of the Gray code, and a 3200 cycle-per-second carrier current E is assigned to represent a 1 digit in the No. 1 position of the Gray code. These 1 digits together or in combination with 0 digits in the Gray code serve to identify the respective columns of storing spaces in FIGS. 2, 4 and 11 during the X-direction movements of ths stacker as further explained below. The 3400, 3600 and 3800 cycle-per-second carrier currents F, G and H, respectively, in FIG. 7 are spares which may be used for effecting other operational functions in FIG. 4 not contemplated in the present explanation.

Referring to FIGS. 4, 7 and 12, different 4000, 4200 and 4400 cycle-per-second signals K, L and M are assigned to represent the Nos. 7, 3 and 1 positions, respectively, in a 3-element Gray code for identifying the respective horizontal rows during Y-direction movements of carriage 40 included in stacker 29 in FIG. 1. The 4600 cycle-per-second signal N is a spare which may be used for another operational function not comtemplated in the present explanation. In FIGS. 4, 7 and 13, the 4800 and 5000 cycle-per-second signals Q and R are assigned to represent the Nos. 3 and 1 positions of a 2-element Gray code for the Z-direction movements of fork 43 on carriage 40 included in stacker 29 in FIG. 1. In FIGS. 4, 7 and 14, the 5200 and 5400 cycle-per-second signals T and U are assigned to the Nos. 3 and 1 positions in a 2-element Gray code for indicating certain operational commands outgoing from console 71 in FIG. 8 to stacker 29 in FIGS. 1 and 4. In FIGS. 4, 7 and 15, the 5600, 5800 and 6000 cycle-per-second signals V, W and # are assigned to represent the Nos. 7, 3 and 1 positions, respectively, in a 3-element Gray code for indicating other operational commands outgoing from the stacker 29 to console 71. In FIG. 7, the 1400, 1800, 2000, 2200 and 2400 cycle-per-second guard signals O, A, J, P and S, respectively, serve to route the X, Y and Z-direction and operational signals outgoing from the central console to the stacker console in FIG. 4 for effectuating the desired operational function thereat while 1600 cycle-per-second signal I serves to route operational signals from the stacker console to the central console in FIG. 4 for achieving the desired operational function thereat.

Before proceeding with further explanation, it is to be understood that the principle of the Gray code is incorporated in the present invention in the following manner. Let it be supposed, for this purpose at the moment, that a command signal OACDE (Gray code 0111 in FIG. 11) comprising the carrier currents included in FIG. 7 has been broadcast from the central control console 70 to the stacker console 29a in FIG. 4 in a manner that is subsequently explained. Component O signifies a 1400 cycle-per-second carrier current serving to identify a command guard signal outgoing from the central control console. For the moment, component O has no further significance. Component A signifies an 1800 cycle-per-second carrier current serving to indicate a command guard signal calling for an X-direction movement of stacker 29 in FIG. 1. For the moment, component A has no further significance. As a matter of fact, components O and A are not included in the Gray code in the present invention. However, components B, C, D and E in FIGS. 4 and 7 represent 1 digits in a 4-element Gray code as hereinafter explained.

As component B is not included in the assumed command signal, its corresponding 2600 cycle-per-second carrier current in FIG. 7 is not broadcast by the central control console; hence, the 15th-position in the assumed Gray code in FIG. 11 is represented by a O digit. Component C identified by a 2800 cycle-per-second carrier current represents the 1 digit in the 7th-position of assumed Gray code signal. Component D identified by a 3000 cycle-per-second carrier current represents the 1 digit by the 3rd-position of the assumed Gray code signal. Component E identified by a 3200 cycle-per-second carrier represents the 1 digit in the 1st-position of the assumed Gray code in FIG. 11. Thus, the digital components of the 4-element Gray code in the assumed example are 0111 representing the 15th, 7th, 3rd and 1st positions, respectively, thereof as indicated in FIG. 11. Since the three successive 1 digits have alternate (+) and (−) values from the previous explanation, their (+)7 corresponds to the 7th position of the assumed 4 -element Gray code, (−)3 corresponds to the 3rd position, and (+)1 corresponds to the 1st position. Algebraically adding (+7,−3 and +1) provides a number 5 which identifies column 5A in the load storing spaces in FIGS. 2 and 4. In a similar manner command signals involving other 4-element Gray codes may be provided for identifying each of the remaining columns in FIGS. 2, 4, 7 and 11.

It is noted, however, that each of the horizontal rows of load storing spaces in FIGS. 2 and 4 may be identified by appropriate command signals including carrier currents arranged in 3-element Gray codes and broadcast from the central console to the stacker console as illustrated in FIGS. 4 and 12; and that certain operational functions may be indicated by the broadcast of appropriate carrier currents arranged in other 3-element Gray code signals broadcast from the stacker console to the central console as shown in FIGS. 4 and 15. It is further noted that each of two opposite Z-transverse direction movements of the load handling fork 43 on carriage 40 in FIG. 1 may be achieved by appropriate command signals including carrier currents arranged in 2-element Gray code signals illustrated in FIG. 13 and broadcast from the central console to the stacker console; and that certain operational functions may be indicated by appropriate command signals including carrier currents arranged in 2-element Gray code signals shown in FIG. 14 and broadcast from the central console to the stacker console.

Central control console 70 in FIG. 4 located at a fixed point removed from load storing space supports 12 and 12a in FIG. 1 generates a plurality of discrete alternating carrier currents O, A, J, P, S, B, C, D, E, K, L, M, Q, R, T and U in a manner known to the art to extend over a frequency range comprising 1400, 1800–3200, 4000–4400, 5200 and 5400 cycles-per-second, with adjacent frequencies separated by a 2000 cycle-per-second band, as shown in FIG. 7. Stacker control console 29a in FIGS. 3 and 4 suitably mounted on stacker 29 in FIG. 1 provides a plurality of discrete alternating carrier current signals I, V, W and # having frequencies 1600, 5600, 5800 and 6000 cycles-per-second, respectively, seperated from adjacent signal frequencies by a 2000 cycle-per-second band as indicatd in FIG. 7.

It is seen in FIGS. 4 and 7 that preselected Gray codes represented by particular 1a currents may be provided to form various broadcast command signals for identifying specific columns at the central console of load storing spaces. For example, an outgoing signal broacast at the central console to effect an X-horizontal movement of the stacker to one of the respective columns of storing spaces may comprise: guard carrier current O (1400 cps) to identify an outgoing signal; guard carrier current A (1800 cps) to identify X-horizontal movement of the stacker; and one or more of carrier currents B (2600 cps), C (2800 cps), D (3000 cps) and E (3200 cps) arranged in various sequences with or without one or more O digits to constitute various 4-element Gray codes. Thus, a broadcast outgoing command signal involving an X-horizontal movement of the stacker relative to conductor 1B of the multi-conductor cable and thereby to storing space column 1a would comprise the following carrier currents in FIGS. 4 and 7: guard O, X-movement guard A, and Gray code E, the latter carrier current E included in the 4-element Gray code 0001. Accordingly, the 1st position of the 4-element Gray code is a 1 digit represented by carrier current E (3200 cps) while the 3rd, 7th and 15th positions of the same Gray code are represented by O digits indicating an absence of broadcast pertinent carrier currents. Applying the alternate (+) and (−) signs to the 1 digits in the Gray code, commencing at the left hand, as above explained, it is seen that the (+)1 in FIG. 11 identifies storing space column 1a in FIG. 2. It is noted in FIG. 4 that the Gray code signals broadcast at the central console to identify the respective conductors 1b through 15b of the multi-conductors cable 49 and thereby the corresponding storing space columns 1a through 15a, respectively, would not include the outgoing guard carrier currents O and A. Hence, only carrier current E in the 1st position of the Gray code would serve to identify conductor 1b and thereby storing space column 1a as above explained and illustrated in FIGS. 2, 4, 7 and 11.

Similarly, a broadcast outgoing command signal pertinent to the X-horizontal movement of the stacker relative to segment 15b and thereby to storing space column 15a would comprise the following carrier currents: guard O (1400 cps), X-movement guard A (1800 cps), and Gray code B (2600 cps), the latter carrier current B included in a 4-element Gray code 1000. Again, the guard carrier currents O and A are not utilized in the Gray code to identify conductor 15b and thereby storing space column 15a. Hence, the 15th position of the Gray code is a 1 digit represented by carrier current B (2600 cps) while the 7th, 3rd and 1st positions of the same Gray code are represented by O digits indicating an absence of broadcast carrier currents. Applying the alternate (+) and (−) signs to the 1 digit in the Gray code, then (16−1=15) in FIG. 11 identifies storing space 15a in FIG. 2. Thus, the carrier current B in the 15th position of Gray code 1000 serves to identify only conductor 15b and thereby only storing space column 15a. Broadcast outgoing command signals for effecting further X-horizontal movements of the stacker relative to segments 2b through 14b one at a time and thereby to corresponding storing space columns 2a through 14a, respectively; one at a time may be formed in a similar manner. It is thus evident that broadcast outgoing command signals formed in a 4-element Gray code in the manner above explained would serve to stop the stacker in its X-horizontal movement in front of the corresponding column of storing spaces in a manner which is subsequently described. It is, therefore, obvious that the positions of the 1 digits in the respective 4-element Gray codes as shown in FIG. 11 have special significance in the respect of providing broadcast carrier currents B, C, D and E of specific frequencies in FIG. 7 in predetermined sequences in the 15th, 7th, 3rd and 1st positions of each Gray code for identifying the respective conductors 1b through 15b and thereby the corresponding columns of storing spaces 1a through 15a, respectively, in FIGS. 2 and 4. In this connection, it is noted that the alternate (+) and (−) signs are applied to the 1 digits in each Gray code, commencing with the left hand 1 digit as explained hereinbefore and illustrated in FIG. 11, to obtain the identity of the respective storing space columns.

Broadcast outgoing command signals originating at the central console for effecting Y-vertical movements of carriage 40 on stacker 29, i.e., a movement of the carriage in a direction perpendicular to the X-horizontal movement of the stacker, once the latter is disposed in front of a preselected column of storing spaces, may be provided by reference to FIGS. 4, 7 and 12 in the following manner. For example, a broadcast outgoing command signal from the central console to provide such Y-vertical movement of the carriage comprises the following carrier currents: guard O (1400 cps), guard J (2000 cps) and one or more of K (4000 cps), L (4200 cps) and M (4400 cps) arranged in various sequences with or without one or more 0 digits to constitute various 3-element Gray code signals. In this command signal each 3-element Gray code represents one of the vertical segments 1 through 7 in FIG. 4 and thereby a corresponding horizontal row of storing spaces in support 12 in FIG. 2. Again, carrier currents K, L and M represent the 1 digits in the Gray code whereas the absence of one or more of the latter carrier currents is represented by the O digits in the Gray code. Thus, a broadcast outgoing command signal from the central console to move the carriage to a position opposite to horizontal row 1 of the storing spaces in FIG. 2, i.e., storing space 1 of any column of storing spaces as represented by conductor 1 in FIG. 4 comprises the following carrier currents: guard O, guard J, and Gray code M (4400 cps). In the latter instance the 3-element Gray code is 001 digits. Accordingly, the 1st position of this 3-element Gray code is a 1 digit represented by the carrier current M (4400 cps) while the 3rd and 7th positions of the same Gray code are represented by 0 digits indicating an absence of broadcast pertinent carrier currents. Applying alternate (+) and (−) signs to the 1 digits in the Gray code, commencing at the left hand side, the (+)1 as illustrated in FIG. 12 identifies horizontal row 1 in FIG. 2.

It is thus apparent that a broadcast outgoing command signal from the central console to provide the Y-vertical movement of the carriage to a position opposite to horizontal row 5 of the storing spaces in FIG. 2, i.e., storing space 5 in any column of storing spaces as represented by segment 5 in FIG. 4 cmprises the following carrier currents: guard O, guard J and Gray code K, L and M in FIG. 7. In this instance the 3-element Gray code is 111. Hence, the 1st position of the 3-element Gray code is a 1 digit represented by carrier current M (4400 cps), the 3rd position of the latter Gray code is a 1 digit represented by carrier current L (4200 cps) and the 7th position of the latter Gray code is a 1 digit represented by carrier current K (4200 cps) in FIG. 12. Applying alternate (+) and (−) signs to the 1 digits as above explained, then [(+7) (−3) (+1)=5], the latter 5 identifying horizontal row 5 in FIG. 2 as indicated in FIG. 12. It is, therefore, obvious that broadcast outgoing command signals originating at the central console to move the carriage in the Y-vertical movement to positions opposite to the respective remaining horizontal rows of storing spaces one at a time in FIG. 2, i.e., the remaining storing spaces in any column thereof as represented by the remaining conductors 2, 3, 4, 6 and 7 in FIG. 4 may be expeditiously formed by reference to FIGS. 4, 7 and 12 in the manner just explained. Again, it is obvious that the positions of the 1 digits in the 3-element Gray codes in FIG. 12 have special significance in the respect of providing broadcast carrier currents K, L and M codes of specific frequencies in FIG. 7 in predetermined sequences in the 7th, 3rd and 1st positions of each Gray code for identifying particular horizontal rows of storing spaces as represented by the respective conductors 1 through 7 in FIG. 4. Now, it is recalled that the application of alternate (+) and (−) signs to the 1 digits in a particular 3-element Gray code enables the derivation of horizontal row number as shown in FIG. 12.

Broadcast outgoing command signals from the central console to provide Z-transverse movements of load handling fork 43 on carriage 40 in FIGS. 1 and 3, i.e. movements transverse to the normal vertical movement of the carriage on the stacker, may be provided by reference to FIGS. 4, 7 and 13 in the following manner. It is recalled here that the Z-transverse movements of the load handling fork include: (a) the extension of the fork into the interiors of the respective load storing spaces in FIGS. 1 and 2 and (b) the retraction of the fork therefrom. For example, an outgoing command signal from the central console to extend the fork into a preselected load storing space comprises the following carrier currents: guard O (1400 cps), guard P (2200 cps) and Gray code Q (4800 cps), the latter current representing one element of a 2-element Gray code 01. In this instance the 1st position of the 2-element Gray code is 1 digit represented by carrier current Q (4800 cps) while the 3rd position of the Gray code is represented by a O digit indicating an absence of a broadcast pertinent carrier current. Here, the position of the 1 digit is not a factor. Built-in logic carried on the stacker responds to the guard P and Gray code 01 to move the fork into the storing space. Another outgoing command signal from the central console to retract the fork from the latter load storing space comprises the following carrier currents: guard O(1400 cps), guard P (2200 cps) and carrier current R (5000 cps), the latter current representing one element of a 2-element Gray code 10. In this instance, the 1st position of the latter Gray code is represented by an O digit indicating an absence of a broadcast pertinent carrier current whereas the 3rd position of the latter Gray code is a 1 digit represented by the carrier R (5000 cps). The position of the 1 digit is not a factor. Built-in logic in the stacker computer responds to the guard P and Gray code 10 to retract the fork from the storing space. Obviously, the broadcast outgoing command signals for the Z-transverse movements may be modified to reverse the positions of the carrier currents Q and R to effect extensible and retractable movements, respectively, of the fork. It is noted that since the Z-transverse movements of the fork involve only the two opposite directions substantially in the same plane, a 2-element Gray code is adequate to achieve such movements as illustrated in FIG. 13.

Outgoing command signals from the central console to achieve specific operations at the stacker console comprise the following carrier currents: guard O (1400 cps), guard S (2400 cps) and carrier currents T and U (5200 and 5400 cycles-per-second, respectively) arranged in 2-element Gray code signals as illustrated in FIG. 14. Outgoing command signals from the stacker to the central console for reporting operational information comprise: guard I and carrier current V, W and # (1600, 5600, 5800 and 6000 cycles-per-second, respectively) arranged in the 3-element Gray code signals shown in FIG. 15. For example, these specific operations may comprise feed back information, checks, alarms, and the like as explained hereinafter.

The operation of the digital control system according to the present invention takes place in the following manner. For this purpose, it is assumed that pallet 22 and load 23 thereon are positioned in load storing space 34 of load support 12 in FIGS. 1 and 2, i.e., in a space included in column 3a and horizontal row 4; the pallet and load are to be retrieved from storing space 34 and deposited in load storing space 126 located in column 12a and horizontal row 6 in FIGS. 1, 2 and 4; and the load handling fork is positioned in front of storing space 141 at the moment.

Figure 8:
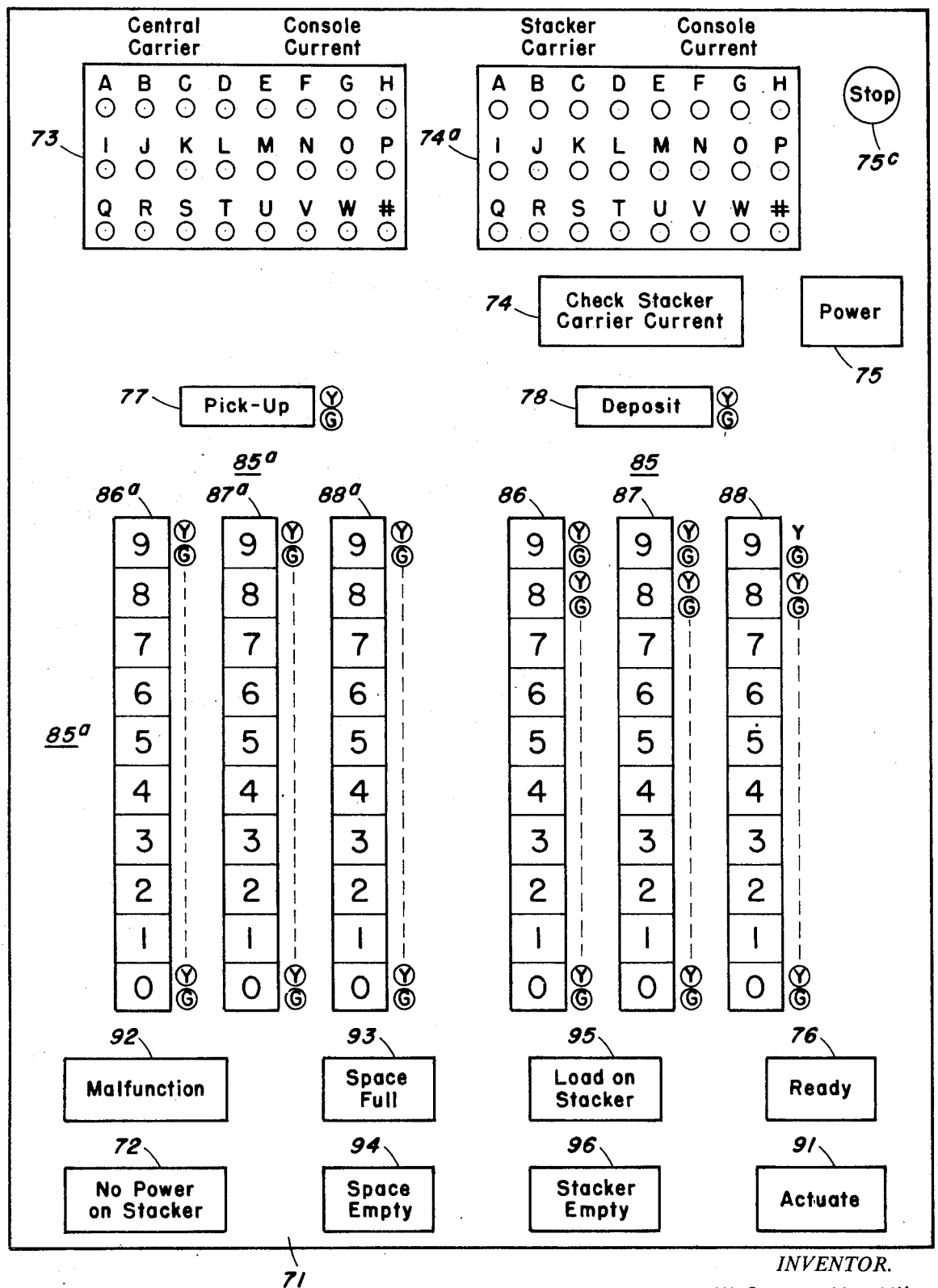
FIG. 8 is a front elevational view of a push button control panel usable in FIG. 4.

FIG. 8 shows a digital push button control panel 71 electrically connected with the central console 70 in FIG. 4 and including a plurality of push buttons for achieving the load retrieval and dispostal just mentioned. Storing space 141 may be assumed, for example, to be connected via an endless conveyor, not shown, to a trucking platform, not shown, for moving loads into and out of the load storing area. It is understood that the stacker in FIG. 1 includes a computer as shown in FIG. 4 for purposes that are hereinafter mentioned. At this moment, it is understood that push button 75a in the push button control panel in FIG. 8 is operated to terminate the supply of electric power to the system in FIG. 4 at any desired time and push button 75 is operated to supply operating power to the latter system. In this state, lamp 72 is illuminated to indicate operating electric power is disconnected from the stacker console in FIG. 4.

Power is restored to the system in FIG. 4 by actuating push button 75. This extinguishes lamp 72 and at the same time illuminates ready lamp 76 for indicating the stacker is performing no operational function at the moment and is awaiting instructions. The extinguishment of lamp 72 is due to the transmission of guard carrier current I (1600 cps) and carrier currents V and # (5600 and 6000 cps frequencies, respectively, in FIG. 7) from the stacker console via electric shoes 52 and 53 engaging conductors 47 and 48, respectively, and central console 70 to the push button control panel in a 3-element Gray code 101 shown in FIG. 15 and represented by the 6000 cps signal in the 1st position to indicate a 1 digit, a O digit in the 3rd position to indicate the absence of a carrier current signal, and the 5600 cps signal in the 7th position to indicate a 1 digit. Applying the alternate (+) and (−) signs to the 1 digits in the Gray code 101, commencing at the left hand as hereinbefore mentioned, this code is translated into a number 6 [(+7) (− 1)=6] whereby a suitable electric switch is operated in an electric circuit in a well-known manner, not shown, to extinguish lamp 72. The ready lamp 76 is illuminated in response to the transmission of guard carrier current I (1600 cps) and carrier current V ( 5600 cps) from the stacker console over the circuit just traced to the push button control panel in a 3-element Gray code 100 in FIG. 15 which is translated into a number 7 in the manner just explained for operating a suitable electric switch in an electric circuit to energize ready lamp 76.

If, however, a faulty condition existed at the stacker, the stacker console would transmit guard carrier current I (1600 cps) and carrier current W (5800 cps) in FIG. 7 in a 3-element Gray code 010 in FIG. 15 via the circuit just identified to the push button control panel. This code 010 is translated into a number 3 in the manner previously explained for operating a suitable electric switch in an electric circuit to energize malfunction lamp 92 in FIG. 8. It is understood that such malfunction Gray code is transmitted by the stacker computer to the push button panel at any time upon the occurrence of the same or other faults at the stacker. In a similar manner, the stacker console transmits further combinations of guard carrier current I together with one or more of carrier currents V, W and # to provide additional Gray codes for indicating the remaining commands outgoing from the stacker console as illustrated in FIG. 15 whereby corresponding lamps 93 through 96 at the central console in FIG. 8 are illuminated.

As carrier currents O, A, J, P, S, B, C, D, E, K, L, M, Q, R, T and U are continuously produced at the central console and carrier currents I, V, W and # are continuously produced at the stacker console by suitable alternating current generators, not shown, well-known in the art, it may be desirable to check this system of FIG. 4 before actual operation as to whether all such carrier currents are being produced and received at the respective consoles. This is achieved by depressing and holding down push button 74 in FIG. 8, whereupon the central console is caused to transmit the above-noted carrier currents on continuous conductors 45 and 46 and slidable pick-up shoes 50 and 51, respectively, engaged therewith to the stacker console which is caused to return those carrier currents, together with carrier currents I, V, W and number produced thereat. Lamp array 73 identifies the carrier currents which are being broadcast at the stacker computer. Non-illumination of any lamps in array 73 indicates the corresponding carrier currents are not being received at the stacker console. Lamp array 74a is actuated by carrier currents derived from conductors 1b through 15b and 1 through 7 in FIG. 4 and returned by the stacker computer to the central console for indicating the progress of the stacker and carriage during their movements in response to given command signals.

Push button control panel 71 in FIG. 8 also includes pick-up push button 77 disposed above an array 85a of digital push buttons comprising a column 86a of hundreds digits O through 9, a column 87a of tens push buttons O through 9, and a column 88a of units push buttons O through 9. This digital push button array is usable to identify the respective storing spaces in support 12 at which a pallet and a load thereon are to be picked up in a manner that is subsequently explained. The push button control panel also includes a deposit push button 78 positioned above an array of digital push button 85 comprising a column 86 of hundreds digits O through 9, a column 87 of tens push buttons O through 9, and a column 88 of units push button O through 9. This digital push button array is usable to identify the respective storing spaces in support 12 at which a pallet and a load thereon are to be deposited in a manner that is hereinafter described. A yellow lamp Y and a green lamp G are positioned adjacent to the pick up and deposit push buttons as well as adjacent to each digit in each column of digits in both arrays 85 and 85a for purposes that are later mentioned. An actuate push button 91 included in the push button control panel is depressed to complete the necessary electric circuit in the familiar manner for supplying operating electric power to the system in FIG. 4 for a purpose mentioned below. In other words, once the push button control panel sets up a pick up and an address or a deposit and an address, push button 91 is actuated to supply electric power to the system of FIG. 4 for achieving either one of the latter two operational set ups.

It is recalled here from the previous explanation that the operation of the invention is being explained in connection with an assumed pick up of the pallet and load thereon in storing space 34 and deposit thereof in storing space 126 while the loading fork and carriage are positioned in front of load storing space 141 at the moment in FIG. 2. It is also recalled that the check of the lamps in array 73 had been satisfactory in response to the depression of push button 74. Push button 75 is now assumed to be depressed to supply the necessary operating electric power to the central and stacker consoles in FIG. 4 in order to extinguish no-power-on-stacker lamp 72 and to illuminate ready lamp 76 in FIG. 8 in the manner mentioned above. At this time, it is understood that actuate push button 91 has not been operated thereby enabling a set up of command pick up and deposit instructions and addresses therefor in the digital push button control panel in accordance with a procedure which is now explained, and further that the ready lamp 76 is illuminated to indicate the stacker is awaiting insturctions and stacker-empty lamp 96 is illuminated to indicate the stacker is available to take on a load in the manner previously described with regard to FIG. 15.

A pick up command is provided by depressing push button 77.

Next, tens and units push buttons 3 and 4 in columns 87a and 88a, respectivelly, are depressed to indicate the load pick up address as storing space 34 in load support 12 in FIGS 2 and 4. As power is now restored to the system in FIG. 4 by depressing push button 75 as above mentioned, it is understood that the central computer is simulatneously and continuously generating carrier currents O, A, J, P, S, B, C, D, E, K, L, M, Q, R, T and U and the stacker computer is simultaneously and continuously generating carrier currents I, V, W and ⋕ shown in FIGS. 4 and 7. The central computer is continuously supplying carrier currents A, B, C, D and E to represent the 1 digits in the 1st, 3rd, 7th and 15th positions of the 4-element Gray codes effective on the respective column conductor 1b through 15b of mulit-conductor cable 49 and the stacker computer is continuously applying carrier currents J, K, L and M received thereat via conductors 45 and 46 and slidable shoes 50 and 51, respectively, to represent the 1 digits in the 1st, 3rd and 7th positions of the 3-element Gray codes effective on the respective horizontal row conductors 1 through 7 of multi-conductor cable 60 as illustrated in FIGS. 7 and 15.

The depression of pick up push button 77 and push buttons 3 and 4 in columns 87a and 88a, respectivey, in push button array 85a as above mentioned is converted by the central computer into a signal comprising carrier currents: O, A, J, P, D, K, L, Q and R. This carrier current signal is transmitted from the central computer via conductors 45 and 46 engaged by slidable pick up shoes 50 and 51, respectively, to the stacker console. The carrier currents included in the latter signal and sent out by the central computer illuminate corresponding lamps in lamp array 73 and the carrier currents received at the stacker computer are returned thereby via conductors 47 and 48 engaged by slidable shoes 52 and 53, respectively, to the push button control panel whereat correspondig lamps are illuminated in lamp array 74a. If the carrier current signal so transmitted and so received checks satisfactorily, the central computer then illuminates the yellow lamps Y adjacent to pick up push button 77 and to push buttons 3 and 4 in columns 87a and 88, respectively, in push button array 85a as an indication of such satisfactory check.

In the last-mentioned carrier current signal transmitted from the central computer to the stacker computer and just identified, carrier current O signifies an outgoing signal from the central computer to the stacker computer; carrier current A indicates an X-direction movement of the stacker; carrier current D represents the 1 digit in the 3rd position and 0 digits in the 1st, 7th and 15th positions of a 4-element Gray code 0010 in FIGS. 4 and 11 for identifying the storing space column address (column 3a in FIGS. 2 and 4) of the load pick-up in the manner explained hereinafter; carrier current J signifies a Y-direction movement of the carriage on the stacker; carrier currents K and L represent 1 digits in the 7th and 3rd positions of the Gray code 110 in FIGS. 4 and 12, including a O digit in the 1st position, for identifying the storing space horizontal row address (row 4 in FIGS. 1, 2 and 4) of the load pick up in the manner hereinafter explained, carrier current P signifies a Z-transverse direction movement of the loading fork relative to the carriage of load storing space address 34; carrier current Q represents a 1 digit in the 1st position of a 2-element Gray code 01 in FIG. 13 for identifying the Z-transverse direction movement of the loading fork from the carriage into the interior of storing space address 34 in a manner described subsequently; and carrier currents Q and R represent 1 digits in the 1st and 3rd positions of a 2-element Gray code 11 in FIIG. 13 for identifying the Z-transverse direction movement of the loading fork out of the interior storing space address 34 and back to the stacker as explained later.

Referring back to the last-mentioned 4-element Gray code 0010 shown in FIG. 12 for identifying the column address 3a in FIGS 2 and 4, it is seen that the 1 digit is disposed in the 3rd position of the Gray code while the 1st, 7th and 15th positions thereof include 0 digits. Applying (+) and (−) values to such 3rd position in the manner hereinbefore explained, the numerical result is the number 3 (+3) which identifies column 3a (i.e., column 3) in FIGS. 2 and 4 as the column address. Thus, it is noted in FIG. 4 that while the central computer continuously applied carrier current D in a 4-element Gray code 0010 to conductor 3b for identifying column 3a (i.e., column 3) in FIGS. 2 and 4, the central computer also continuously applied other carrier currents in different 4-element Gray codes to the remaining conductors 1b, 2b and 4b through 15b as illustrated in FIGS. 4, 7 and 11 for identifying the respective corresponding columns 1a, 2a, and 4a through 15a in FIGS. 2 and 4 in a similar manner.

It is recalled that the stacker is presently located at storing space 141, i.e., in front of column 14a with the carriage in front of horizontal row I in FIGS. 2 and 4. This means that the central console is supplying outgoing guard carrier current A together with carrier currents B and E to conductor 14b in FIG. 4, the latter two carrier currents B and E arranged in a 4-element Gray code 1001 as shown in FIGS. 4 and 11. Thus, carrier currents B and E (2600 and 3200 cps) represent 1 digits in the 15th and 1st position of the Gray code 1001 in FIGS. 7 and 11 for the X-direction, while the absence of one or more carrier currents in the latter code is represented by a 0 digit. A second computer included in the stacker console and emboying a well-known structure derives the carrier currents B and E in the Gray code 1001 via pick up shoes 54a, 54b and 54c from conductor segment 14b. The stacker computer applies (+) and (−) values to the 1 digits in the Gray code 1001 in the manner previously explained and algebraically adds the Gray code numbers (+15) and (−1) to produce a resulting number (+)14 which identifies conductor 14b (column 14a, i.e., column 14) as part of the present address of the stacker.

At this time, the central computer is supplying guard carrier current J, together with carrier current M to conductor segment 1, in FIG. 4, the latter carrier current M arranged in a 3-element Gray code 001 as shown in FIGS. 4 and 12. Thus, carrier current M (4400 cps) represents a 1 digit in the 1st position of the Gray code 001 for the Y-direction while the absence of one or more carrier currents in the latter code is represented by a O digit. The stacker computer derives the carrier current M in the Gray code 001 from conductor segment via a first group of pick up shoes 60a, 60b and 60c in FIGS. 4, 5 and 16 from conductor 1, and applies the (+) and (−) values to the 1 digit in the manner previously described to produce a resulting number (+)1 which identifies the horizontal row of storing spaces in FIG. 2 before which the carriage is presently disposed. Thus, it is seen that the stacker is presently positoned at storing space 141, i.e., at column 14 (column 14a in FIG. 4) and horizontal row 1 in FIGS. 2 and 4. As hereinafter pointed out, a pick up operation activates the first shoe group 60a, 60b and 60c, while the second shoe group 60d, 60e and 60f remains inactive.

It is also recalled now that a new address, storing space 34, in the X-direction has been provided for the stacker. This means that the central console is supplying carrier current D (3000 cps) in a 4-element Gray code 0010 to the stacker computer as well as to conductor segment 3b at the moment. As the carrier current D represents the 1 digit in the 3rd position of the Gray code as shown in FIGS. 4, 7 and 11, the stacker computer provides a +3 output which identifies segment 3b and thereby column 3a (or column 3) in FIGS. 2 and 4. As the stacker has a present address of column 14a (or column 14) and a new address of column 3a (or column 3), the stacker computer subtracts the number 14 from the number 3 to produce a (−) difference number. This requires a movement of the stacker from the right to the left in the X-direction in FIGS. 2 and 4 as hereinafter explained. If the reverse were the fact, i.e., the stacker was at the present address column 3a represented by carrier current D in Gray code 0010 and a new address column 14a represented by carrier currents B and E in Gray code 1001 as previously mentioned, then the stacker would subtract the 3 number from the 14 number to provide a (+) difference number. This requires a movement of the stacker from left to right in the X-direction in FIGS. 2 and 4 as later pointed out.

It is noted that when the central computer transmits the above-identified carrier currents, lamps corresponding thereto are illuminated in lamp array 73, and that the stacker computer automatically checks the carrier currents received thereat and returns them to the central console. If the results of such check are satisfactory by illuminating the identical lamps in lamp array 74a, the yellow lamps adjacent to pick up push button 77 and push buttons 3 and 4 in columns 87a and 88a in push button array 85a remain illuminated while the green lamps G associated therewith remain in the extinguished state. Obviously, if a discrepancy occurred between the carrier currents transmitted by the central computer and those received at the stacker computer, malfunction lamp 92 in FIG. 8 would be illuminated in the manner previously explained.

Due to (−) difference number resulting from the subtraction of number 14 from number 3 as hereinbefore stated, the stacker computer supplies a voltage of apropriate polarity to energize motor 36 in FIGS. 1 and 3 for actuating roller 31 connected thereto in such rotational direction as to move the stacker in the X-horizontal direction from column 14a toward column 3a, i.e., in the direction from right to left in FIGS. 2 and 4. At this time, it is understood that the loading fork embodied in the stacker carriage is retracted to its normal position therein for obviating damage in the proximate area because of a mal-positoned loading fork. As the stacker is moving from right to left in the X-direction, the stacker computer derives via pick up shoes 54a, 54b, and 54c slidably engaging conductors 13b, 12b, 11b, etc., in turn the several carrier currents arranged in the successive Gray codes 1011, 1010, 1110, etc., representing columns 13a, 12a, 11a, etc., as shown in FIGS. 4, 7 and 11. The stacker computer compares the carrier currents in the respective Gray codes as derived from the successive conductors of the multi-conductor cable 49 with the new address carrier currents arranged in the Gray code 0010 supplied by the central computer to the stacker computer for providing successive (−) difference numbers whereby the energization of motor 36 with the same voltage is continued.

So long as the stacker computer provides the (−) differene number in response to the foregoing comparison, motor 36 is energized with the same voltage to continue the movement of the stacker from the right to left in the X-direction. In due course, pick up shoes 54a, 54b and 54c engage conductor 3b from which the stacker computer derives carrier current D arranged in Gray code 0010 which is identical with the carrier current D arranged in the same Gray code 0010 and supplied thereto by the central computer over conductors 45 and 46 and shoes 50 and 51, respectively, slidably engaged therewith. Now, the stacker computer comparing the last-mentioned carrier currents D arranged in the same Gray code 0010 and produces no difference number therebetween. This causes the stacker computer to terminate the supply of operating electric voltage to motor 36 which is thereby stopped to position the stacker in front of column 3a (or column 3) in FIGS. 2 and 4. The manner of gradually reducing the magnitude of the operating electric voltage to motor 36 for gradually reducing the speed of movement of the stacker from a full speed to a gradually decreasing speed and then to a full stop is hereinafter explained. Lamp array 74a in FIG. 8 illuminates different lamps to indicte the progress of the stacker from column 14a to column 3a. The use of pick up shoes 54a, 54b and 54c for decelerating and stopping the stacker is hereinafter explained.

As the stacker was moving from right to left in the X-direction as just explained, the central computer is also supplying carrier currents arranged in different 3-element Gray codes to the horizontal row conductors 1 through 7 within the multi-conductor cable 60 as hereinbefore explained and illustrated in FIGS. 2, 4 and 12. Since the carriage is initially assumed to be disposed in front of horizontal conductor 1 and thereby in front of horizontal row 1 in FIGS. 1, 2 and 4, the central computer is continuously supplying carrier current M arranged in the 3-element Gray code 001 as previously mentioned, and the latter carrier current, together with carrier currents K and L arranged together or in combination with an 0 digit to form other Gray codes illustrated in FIGS. 4, 7 and 12 for identifying the remaining horizontal rows 2 through 7 of storing spaces in FIGS. 2 and 4. The stacker computer is also comparing the carrier current M derived via pick up shoes 60a, 60b and 60c from horizontal conductor 1 and arranged in Gray code 001 with the new address carrier currents K and L arranged in Gray Code 110 and supplied via conductors 45 and 46 and engaging shoes 50 and 51 by the central computer to the stacker computer as the new horizontal address horizontal row 4 in the manner hereinbefore mentioned. As the carrier current M represents a 1 digit in the 1st position of the Gray code 001 in FIGS. 4 and 12, the stacker computer produces a number 1 identifying horizontal row 1. As carrier currents K and L represent 1 digits in the 7th and 3rd position of the Gray code 110 in FIGS. 4 and 12, the stacker computer produces a number 4 (+7 and −3 in FIG. 12). Now, the stacker computer subtracts the number 1 from the number 4, because the carriage is going to move from the horizontal row 1 to horizontal row 4, to provide a (+) difference number. This requires an up movement of the carriage in the Y-direction as hereinbefore explained. If the reverse were the fact, i.e., the carriage was in front of horizontal row 4 for a down-movement in the Y-direction to horizontal row 1, then the stacker would subtract the number 4 from the number 1 to provide a (−) difference number requiring such down-movement.

Due to the (+) difference number resulting from the subtraction of number 1 from number 4 as just mentioned, the stacker computer supplies a voltage of appropriate polarity to motor 37 in FIGS. 1 and 3 for actuating sprocket 38 and thereby chain 39 in such direction as to move the carriage in the Y-direction up from horizontal row 1 toward horizontal row 4. As pick up shoes 60a, 60b and 60c pass from horizontal conductor 1 to horizontal conductors 2 and 3 in succession to derive carrier currents L and M alone or together or in combination with one or more 0 digits, the stacker computer compares the derived carrier currents in the corresponding Gray codes with the new address carrier currents arranged in the new address Gray code 110 as illustrated in FIGS. 2 and 4 for producing (+) successive difference numbers (i.e., subtracting 2 or 3 from 4 in the respect explained above) to continue the energization of motor 37 with the same voltage.

So long as the stacker computer produces such (+) difference number, motor 37 is energized with the same voltage to continue the up movement of the carriage in the Y-direction. In due course pick up shoes 60a, 60b and 60c engage horizontal-row conductor 4 from which the stacker computer derives carrier currents K and L arranged in Gray code 110 which is identical with the same carrier currents K and L arranged in the same Gray code 110 and supplied by the central computer over conductors 45 and 46 and shoes 50 and 51, respectively, slidably engaged therewith. Now, the tacker computer comparing carrier currents K and L arranged in the same Gray code 110 produces no difference number therebetween. This causes the stacker computer to terminate the supply of operating electric voltage to motor 37 which is thereby stopped to position the carriage in front of horizontal row 4. Now, the stacker and carriage are positioned in front of storing space 34 in FIGS. 2 and 4 in accordance with the new address requirement supplied via push button array 85a. This causes the central computer to extinguish the yellow lamps Y adjacent push buttons 3 and 4 in columns 87a and 88a, respectively, in push button array 85a in FIG. 8 and simultaneously therewith to illuminate the associated green lamps G. The illumination of these green lamps G indicates at the central computer that the stacker and carriage are now positioned at the correct new address. The use of pick up shoes 60a, 60b and 60c for gradually reducing the magnitude of the operating voltage supplied to motor 37 for gradually reducing the speed of movement of the carriage from a full speed to a gradually decreasing speed and then to a full stop is hereinafter explained. Lamp array 74 shows the progress of the carriage movement.

While the foregoing X and Y-movements of the stacker and carriage, respectively, are described as apparently separate movements, this is not necessarily so. Obviously, the stacker computer may be programmed, and is usually so programmed, to vary the simultaneous energization of motors 36 and 37 in such manner as to control the relative moving speeds of the stacker and carriage for positioning both thereof at the assigned new address substantially at the same time, depending upon whether the stacker or the carriage is required to travel the longer distance in response to the new address command signal. It is also obvious that the central and stacker computers may be programmed to pick up a load at the nearest available storing space relative to the position at which the stacker received such command signal, assuming identical loads are positioned in the storing spaces in a given storing support, or to deposit a load in the nearest empty available storing space relative to the storing space at which the load was picked up.

As the stacker is now positioned at the correct address of preselected storing space 34 in load support as previously mentioned, the load pick up command already set up via the depression of pick up push button 77 in control panel 71 remains to be performed to complete the first half-cycle of the assigned operation. This means that motors 36, 37 and 41 are de-energized at the moment, and further that motor 41 is awaiting an instruction to activate the load handling fork, which is now empty in the Z-transverse direction into the interior of preselected storing space 34. For this purpose, guard carrier current P and carrier current Q, the latter arranged in the 1 digit position of 2-element Gray code signal 01 shown in FIGS. 7 and 13, are effective at stacker computer at this time. In response to these currents, the stacker computer energizes motor 41 which actuates gear 42 and rack 42a in FIGS. 1 and 3 to extend loading fork 43 into the interior of storing space 34 to a position below the under face of pallet 22 carrying load 23 in FIG. 2, approximately at the midpoint of the pallet whereupon motor 41 is de-energized and stopped. Next, the stacker computer supplies operating voltage to motor 37 which thereupon elevates the carriage to engage the pallet, and thereafter continues the energization of motor 37 which further elevates the carriage and fork together with the pallet and load to permit the pallet to clear transverse members 21, 21. Then, motor 37 is de-energized and stopped.

Next, carrier currents P, Q and R the latter two representing 1 digits in the 1st and 3rd positions of the 2-element Gray code 11 shown in FIGS. 7 and 13 are effective in the stacker computer. In response to the carrier currents Q and R in the latter code, the stacker computer supplies electric voltage to motor 41 which is so energized thereby as to actuate gear 42 and rack 42a to withdraw the fork together with the pallet and load thereon from the interior of storing space 34 to the carriage, and and is thereafter energized and stopped. Now, the stacker computer energizes motor 37 to lower the carriage to a normal position on the stacker, and thereupon terminates the supply of electric voltage to stop motor 41. At this time, the stacker computer may be programmed to return suitable signals to the central computer for indicating thereat that (1) the fork and carriage are properly returned to its normal position on the stacker, and (2) the load does not project beyond the physical limits of the carriage. These signals serve to indicate that the stacker is ready to be moved without endangering the load, the carriage or the stacker as the latter is moved to a new address in the manner which is presently explained. At this time, the stacker computer is programmed to transmit an appropriate signal back to the central computer for the purpose of extinguishing the yellow lamp Y at pick up push button 77 in push button control panel 71 in FIG. 8 and to illuminate the green lamp G at push button 77. This indicates that (1) the first half-cycle, i.e., go to storing space 34 as a given command address and pick up the load therein, of the previously assumed full cycle operational function is completed, and (2) the system of FIG. 4 is returned to a normal state including push buttons 3 and 4 in push button columns 87a and 88a, respectively, in FIG. 8. At this time push button 77 is returned to its normal position in FIG. 8 and the green lilght thereat is extinguished. Ready light 76 is illuminated.

The system of FIG. 4 is now ready to perform the second half-cycle, i.e., go to storing space 126 in load support 12 as the new address and deposit therein the pallet and load now on the loading fork in response to the previously assumed full cycle operational function. For this purpose, a deposit command is provided by depressing deposit push button 78, and the new address by depressing push buttons 1, 2 and 6 in push button columns 88, 87, and 86, respectively, in push button array 85 in FIG. 8. It is understood that the central computer is simultaneously and continuously generating carrier currents O, A, J, P, S, B, C, D, E, K, L, M, Q, R, T and U while the stacker console is simultaneously and continuously generating carrier currents I, V, W and#shown in FIGS. 4 and 7. Push button 91 is depressed to start the second half-cycle of the system of FIG. 4. The central computer is continuously supplying carrier currents A, B, C, D and E to represent the 1 digits in the 1st, 3rd, 7th and 15th positions of the 4-element Gray codes effective on the respective column conductors 1b through 15b and the stacker computer is continuously applying carrier currents J, K, L and M received thereat via conductors 45 and 46 and engaging pick up shoes 50 and 51, respectively, to represent the 1 digits in the 1st, 3rd and 7th positions of the 3-element Gray codes effective on the respective horizontal row conductors 1 through 7 as illustrated in FIGS. 4, 7, 11 and 12 and mentioned hereinbefore.

The depression of deposit push button 78 and push buttons 1, 2 and 6 in columns 86, 87 and 88, respectively, in push button array 85 as above mentioned is converted by the central computer into a signal comprising carrier currents: O, A, J, P, B, D, K, M, Q and R. The carrier currents of this signal transmitted by the central computer to the stacker computer via the circuit previously traced illuminates corresponding lamps in lamp array 73, and the carrier currents received at the stacker computer and returned thereby over the above identified circuit illuminates corresponding lamps in lamp array 74a, as the stacker, carriage and load handling fork are moved through the various positions necessary to complete the deposit operation as previously mentioned. If this carrier current signal so transmitted and so received check satisfactorily, the central computer then illuminates the yellow lamps Y adjacent to deposit pick up button 78 and push buttons 1, 2 and 6 in the push button columns 86, 87 and 88, respectively, of push button array 85 as an indication of such satisfactory check.

In the last-mentioned carrier current signal transmitted from the central computer to the stacker computer and just identified, guard carrier current O signifies an outgoing signal from the central computer; guard carrier current A indicates an X-direction movement of the stacker; carrier currents B and D represent the 1 digits in the 3rd and 15th positions and O digits represent the 1st and 7th positions of a 4-element Gray code 1010 in FIGS. 4 and 11 for identifying the storing space column address (column 12a in FIGS. 2 and 4) of the load deposit in the manner subsequently explained; guard carrier current J signified Y-vertical movement of the carriage on the stacker; carrier currents K and M represent 1 digits in the 1st and 7th positions and an O digit represents the 3rd position in a 3-element Gray code 101 in FIGS. 4 and 12 for identifying the storing space horizontal row address (row 6 in FIGS. 1, 2 and 4) of the load deposit in the manner hereinafter explained; guard carrier current P signifies a Z-transverse direction movement of the loading fork relative to the carriage or load storing space address 126; carrier current Q represents the 1 digit in the 1st position of a 2-element Gray code 01 in FIG. 13 for identifying the Z-transverse direction movement of the loading fork from the carriage into the interior of the new storing space address 126; and carrier currents Q and R represent 1 digits in the 1st and 3rd positions of a 2-element Gray code 11 in FIG. 13 for identifying the Z-transverse direction movement of the loading fork from the interior of storing space address 126 back to the carriage.

Referring now to the last-mentioned 4-element Gray code 1010 for identifying column address 12a in FIGS. 2, 4 and 11, it is seen that 1 digits are disposed in the 15th and 3rd positions of the latter code. Applying (+) and (−) values to the 15th and 3rd positions in the manner hereinbefore explained, the numerical result is the number 12 by algebraically adding [(+15) and (−3)]which identifies column 12a (i.e., column 12) in FIGS. 2 and 4 as the new column address. Thus, it is noted that while the central computer continuously applies carrier currents B and E in the 4-element Gray code 1010 to conductor 12b for enabling the identification of column 12a in a manner explained hereinafter, the carrier computer also continuously applies other carrier currents in different Gray codes to the remaining conductors 1b through 11b and 13b through 15b as illustrated in FIGS. 4, 7 and 11 for identifying the respective corresponding storing space columns 1a through 11a and 13a through 15a in FIGS. 2 and 4 in a similar manner.

It is now recalled from the previous explanation that at the termination of the load pick up half-cycle, the stacker is positioned in front of column 3a and the carriage or loading fork is positioned in front of horizontal row 4 in FIGS. 2 and 4 (i.e., in front of load storing space 34) and the new address for the disposal of the load presently on the loading fork is load storing space 126 in load support 12. At this time, it is assumed that push button 75 is depressed from the first half-cycle operation for supplying operating power to the central and stacker consoles including the respective computers included therein and ready lamp 76 is illuminated for indicating the stacker is awaiting new instructions. It is also recalled at this time from the previous explanation that load-on-stacker lamp 95 is illuminated in response to a carrier current signal transmitted from the stacker computer to the central computer, viz., I, W and # the carrier currents W and # included in the 3rd and 1st positions, respectively, of a 3-element Gray code 011 as illustrated in FIG. 15.

As the stacker is now positioned in front of loading space 34 and is commanded to go therefrom to storing space 126 at the moment, this means that the stacker computer subtracts the number 3 from the number 12 to produce a (+) difference number which requires the stacker to move from left to right in the X-direction in FIGS. 2 and 4 as previously explained. This causes the stacker computer to supply a voltage of appropriate polarity to energize motor 36 which actuates roller 31 in such rotational direction as to move the stacker from column 3b toward column 12b, i.e., in the direction from left to right in FIGS. 2 and 4. As the stacker is moving from left to right in the X-direction, the stacker computer derives via pick up shoes 54a, 54b and 54c engaging conductor segments 3b, 4b, 5d, etc. in turn the several carrier currents effective thereon and arranged in the successive Gray codes 0010, 0110, 0111, etc., representing columns 3a, 4a, 5c, etc. as shown in FIGS. 4, 7 and 11. The stacker computer compares the carrier current code signals as derived from the successive conductors of the multi-conductors cable in the respective Gray codes with the new address carrier currents arranged in the Gray code 1010 supplied by the central computer to the stacker computer for providing successive (+) difference numbers whereby the energization of motor 36 with the same voltage is continued.

So long as the stacker computer provides the (+) difference voltage in response to the last-mentioned comparison, motor 36 is energized with the same voltage to continue the movement of the stacker from left to right in the X-direction. In due course, pick up shoes 54a, 54b and 54c engage conductor 12b from which the stacker computer derives carrier currents B and D arranged in Gray code 1010 which is identical with the carrier currents B and D arranged in Gray code 1010 and supplied thereto by the central computer in the circuit previously traced. Now, the stacker computer comparing the last-mentioned carrier currents B and D arranged in the two Gray codes 1010 produces a zero difference number therebetween. This causes the stacker computer to terminate the supply of operating electric voltage to motor 36 which is thereby stopped to position the stacker in front of column 12a (i.e., column 12) in FIGS. 2 and 4, the use of pick up shoes 54a, 54b and 54c for gradually reducing the magnitude of the operating electric voltage to motor 36 for correspondingly reducing the speed of movement of the stacker from a full speed to a gradually decelerating speed, and finally to a full stop is subsequently explained.

As the stacker is moving from left to right in the X-direction as just mentioned, the central computer is also supplying carrier currents arranged in different 3-element Gray codes to the horizontal row conductors 1 through 7 and illustrated in FIGS. 2, 4 and 12. Since the disposition of the carriage and loading fork thereon was in front of storing space 34 (i.e., horizontal row 4 in FIGS. 1, 2 and 4) a the completion of the first half-cycle of the assumed operation, this means that the central computer is continuously supplying carrier currents K and L arranged in 3-element Gray code 110 as above mentioned as well as other carrier currents arranged in different 3-element Gray codes to the remaining horizontal row segments 1 through 3 and 5 through 7 as previously described and illustrated in FIGS. 4 and 12. Since a deposit operation is now called for in FIG. 4, it is recalled that shoes 60d, 60e and 60f are active while shoes 60a, 60b and 60c are inactive. At this moment, the stacker computer is also comparing the carrier currents K and L derived from horizontal row conductor 4 in FIG. 4 via shoes 60a, 60b and 60c and arranged in Gray code 110 with the new address carrier currents K and M arranged in Gray code 101 and supplied by the central computer to the stacker computer as the new horizontal-address horizontal row 6 in the manner previously explained. In response to the carrier currents K and L representing 1 digits in the 7th and 3rd positions of Gray code 110 in FIGS. 4 and 12, the stacker computer produces a number 4 [by algebraically adding (+7) and (−3) in FIG. 12] for identifying the present-address horizontal row 4 as previously explained. At this time and in response to command carrier currents K and M representing 1 digits in the 7th and 1st positions of Gray code 101 in FIGS. 4 and 12, the stacker computer produces a number 6 [by algebraically adding (+7) and (−1) in FIG. 12] for identifying the new-address horizonal row 6. Now, the stacker computer subtracts 4 from 6, because the carriage is going to move from horizontal row 4 to horizontal row 6, to provide a (+) difference number. This requires an up movement of the carrige in the Y-direction as hereinbefore explained.

Due to the (+) difference number resulting from the subtraction of the number 4 from the number 6 as just mentioned, the stacker computer supplies a voltage of appropriate polarity to motor 37 in FIGS. 1 and 3 for actuating sprocket 38 and thereby chain 39 in such direction as to move the carriage in the Y-direction up from horizontal row 4 toward horizontal row 6. As pick up shoes 60d, 60e and 60f pass from horizontal row segment 4 to horizontal row segment 5, the stacker computer compares the carrier currents K, L and M in Gray code 111 derived via shoes 60d, 60e and 60f with the new-address carrier currents K and M in the Gray code 101 and still provides a (+) difference number to continue the energization of motor 37 with the same voltage. In due course pick up shoes 60d, 60e and 60f engage horizontal row segment 6 from which the stacker computer derives carrier currents K and M arranged in Gray code 101 for comparison with the command carrier currents arranged in the same Gray code whereupon the stacker computer provides a zero difference number by subtracting the number 6 from the number 6. In response to such zero difference number, the stacker computer terminates the supply of operating the electric voltage to motor 37 which is thereby stopped to position the carriage in front of horizontal row 6. Now, the stacker and carriage are positioned in front of storing space 126 in FIGS. 2 and 4 in accordance with the new address as mentioned above. This causes the central computer to extinguish the yellow lamps Y adjacent push buttons 1, 2 and 6 in columns 86, 87 and 88, respectively, in push button array 85 in FIG. 8 and simultaneously therewith to illuminate the associated green lamps G. This extinguishment of the yellow lamps coupled with the illumination of the green lamps indicates at the central computer that the stacker and computer are now positioned at correct new address. The use of pick up shoes 60d, 60e and 60f for gradually reducing the magnitude of the operating voltage supplied to motor 37 for correspondingly reducing the speed of movement of carriage from full speed to a gradually decelerating speed, and finally to a full stop is hereinbelow explained.

As the stacker and carriage are now positioned at the correct new address of storing space 126 in load support 126 as just pointed out, the disposal command already set up in push button 78 in control panel 71 remains to be performed. This means that motors 36 and 37 are stopped and that motor 41 for activating the loading fork in the Z-transverse direction is also stopped and awaiting new instructions for the latter purpose. At this time, carrier currents P and Q, the latter carrier current Q representing the 1 digit in the 1st position of 2-element Gray code 01 shown in FIGS. 7 and 13 and stated above, are effective in the stacker computer at the moment.

Now, the stacker computer activated by guard carrier current P and carrier current Q, the latter disposed in the 1st position of 2-element Gray code 01 supplies operating voltage of such polarity to motor 41 as to actuate gear 42 and rack 42a to extend the loading fork and load thereon in the Z-direction into the interior of storing space 126 to a position immediately above transverse members 21, 21, positioned therein as shown in FIG. 1. The stacker computer is programmed to supply operating voltage to motor 37 which thereupon lowers the carriage together with the load thereon to dispose the pallet onto transverse members 21, 21. The stacker computer continues the supply of operating electric voltage to motor 37 which is energized to continue the lowering of the carriage and loading fork until the loading fork disengages the pallet, and then terminates the supply of voltage to motor 37 which is thereby stopped. At this time, motors 36, 37 and 41 are stopped. Thus, the pallet and load thereon are now positioned in the new address of storing space 126 in response to the new command.

Next, carrier currents P, Q and R, the latter two representing 1 digits in the 1st and 3rd positions of the 2-element gray code 11 shown in FIGS. 7 and 13, are effective in the stacker computer. In response to these carrier currents, the stacker computer supplies operating voltage to motor 41 which is so energized thereby as to actuate gear 42 and rack 42a to withdraw the fork from the interior of storing space 126 to a position on the carriage, and thereupon terminates the supply of electric voltage to stop the motor 41. Now, the stacker computer supplies operating electric voltage to motor 37 which actuates sprocket 38 and chain 39 to move the carriage and fork up one inch to their normal positions on the stacker. At this time, the stacker computer may be programmed to return suitable signals to the central computer for so indicating thereat that the fork is properly returned to its normal position on the carriage, and is also programmed to transmit an appropriate signal back to the central computer for the purpose of extinguishing the yellow lamp Y at deposit push button in push button control panel 71 in FIG. 8 and to illuminate the green lamp G associated therewith. This indicates that (1) the second half-cycle, i.e., go to storing space 126 and deposit the pallet and load therein, of the previously assumed full cycle is completed and (2) the system of FIG. 4 including push button control panel 71 is returned to a normal state. Now, the system of FIG. 4 including the stacker is ready to start a new address and a new operational function.

The stacker is precisely positioned in front of horizontal conductor 3b and thereby precisely in front of corresponding column 3a by reference to FIGS. 4 and 9 in the following manner. Middle shoe 54b picks up code signals for coarse positioning of the stacker, whereas outer shoes 54a and 54c pick up carrier signals for the fine positioning of the stacker from the successive horizontal segments 14b, 13b, 12b, 11b, etc., as all three shoes are successively engaged therewith during the X-horizontal movement of the stacker from column 14a toward column 3a under control of energized motor 36 in the manner just explained. During this time, it is understood that motor 36 attains full speed under control of the stacker computer as above explained to drive the stacker at full speed until the stacker reaches a predetermined distance from its ultimate destination which is column 3a for the purpose of this explanation. From such predetermined distance to its ultimate destination, the speed of the stacker is gradually reduced from its full speed to a predetermined low speed when the stacker computer provides a difference, for example, of one digit between the signal voltage picked up by coarse inner shoe 54b and the carrier voltage picked up by one of the precise adjustment shoes 50a and 51c. At this point, which is, for example, approximately a distance equal to the width of 1½ storing spaced from the desired stopping storing space, i.e., approximately at the middle of column 5a relative to column 3a, the control of the stacker speed is automatically transferred at the stacker computer from inner coarse shoes 54b to outer shoes 54a and 54c for a fine adjustment of the stacker speed via motor 36 to stop the stacker at its ultimate destination. As shown in FIG. 9, at least one of shoes 54a, 54b and 54c must always engage at least one horizontal conductor of the successive conductors 1b through 15b in FIG. 4. As a consequence, the length of the electric contact surface of each shoe is greater than the distance between the ends of adjacent conductors as shown in FIG. 9. Thus, the distance $a$ between the outer edges of shoes 54a and 54c must be smaller than the distance $b$ between the ends of any two segments 1b through 15b separated by one thereof as illustrated in FIG. 9 by an amount to allow for manufacturing tolerances.

When shoe 54b straddles the distance beween the ends of two adjacent horizontal conductors 1b through 15b, the numerical frequency value of the carrier current code signal picked up by the latter shoe is equal to the numerical frequency value of the carrier current Gray code applied to one of such two adjacent conductors. It is thus apparent that shoe 54b may pick up the carrier voltage Gray code signals effective on both conductors straddled thereby at the moment. As the signals on all adjacent conductors differ in design by one carrier current, shoe 54b, therefore, picks up the highest number of carrier currents applied to one of the two straddled segments, and the number of carrier currents included in the Gray code signal picked up by shoe 54b represents such one segment. The stacker computer control of the speed of motor 36 and stacker 29 in FIG. 1 is so designed that the low speed thereof is approximately attained as the stacker arrives approximately at the midpoint of column 3a as mentioned hereinbefore. The midpoint of the stacker is stopped precisely at the midpoint of column 3a when all shoes 54a, 54b and 54c pick up the carrier current Gray code signal identical with the preselected command carrier current Gray code signal (0010 digits) which is effective on segment 3b to represent column 3a for the purpose of the instant description.

The accuracy of the final position of the stacker is determined by the distance $d$ when the stacker is moved either to the left or the right by the distance $d$, the magnitude of the carrier voltage Gray code signal effective on shoe 54a is greater than the carrier voltage Gray code signal effective on shoe 54c, or vice versa, causing the fine corrective action just explained. In other words, when shoe 54c engages conductor 5b while shoe 54a and 54b are engaging conductor 4b in FIG. 9, a negative difference voltage derived from the carrier current Gray codes effective on conductors 4b and 5b in the manner above explained to a magnitude of the order of 1½ volts activates the stacker computer to reduce the speed of motor 36 and thereby the speed of the stacker in the X-direction to the left in FIG. 2 to the low value. When shoe 54c engages segment 4b while shoes 54a and 54b are engaging segment 3b, such negative deifference voltage is reduced to 1 volt. When all three shoes 54a, 54b and 54c engage conductor 3b as shown in FIG. 9, a zero difference voltage is produced. This enables the stacker computer to stop the midpoint of the stacker substantially at the midpoint of column 3a. When shoe 54a engages conductor 2b while shoes 54b and 54c engage conductor 3b, the opposite action takes place. That is, a positive difference voltage activates motor 36 to move the stacker in the X-direction to the right until all three shoes 54a, 54b and 54c engage conductor 3b as shown in FIG. 9 when the zero difference voltage is produced. This enables the stacker computer to stop the midpoint of the stacker substantially at the midpoint of column 3a. Thus, the fine corrective action is determined by $+d$ as shown in FIG. 9. It is obvious that coarse shoe 54b may be omitted so that the average voltage value of the carrier voltage Gray code signals picked up by shoes 54a and 54c may be supplied to the stacker computer to provide a coarse adjustment and stoppage of the stacker in the manner just explained.

FIG. 10 illustrates aa modification of FIG. for utilizing carrier current Gray code signals to provide coarse and fine adjustments of the X-horizontal movements of the stacker. Rectangular forms 100, 101 and 102 of electric conductors may be mounted, for example, at adjacent storing space columns 2a, 3a, 4a of support 12 in FIG. 2 for the purpose of this explanation. Each form is supplied with a different carrier current Gray code signal to identify the corresponding storing space column in the manner of FIG. 4. While only three adjacent storing space columns are illustrated in FIG. 10, it is understood that similar electric conductor forms may be mounted at the remaining storing space columns in support 12. Rectangular forms 104, 105, 106 and 107 of electric conductors similar to but smaller than forms 100, 101 and 102 are mounted on the stacker to pick up the carrier current Gray code signals by induction from forms 100, 101 and 102 for ultilization by the stacker computer. Forms 104 and 105 and 106 and 107 functioning as discrete groups pick up inductively the different digital Gray code signals from forms 100, 101 and 102 for use in the stacker computer to provide coarse and fine adjustments of the X-horizontal movements of the stacker essentially in the manner explained above regarding FIG. 9. While the use of rectangular conductors and the like is explained in regard to the support including storing space columns, it is apparent that such conductors may also be expeditiously used on the stacker and carriage in FIGS. 1 and 4 for controlling the positioning of the carriage relative to the storing space horizontal rows.

It is understood that the rectangular conductor forms above mentioned may be replaced by suitable conductor forms of other configurations such, for example, as coils and the like. It is also obvious, that the respective Gray code signals in FIGS. 4 and 7 may be transmitted and received by appropriate radio and sound equipments for the load handling purposes herein described.

The carriage is precisely positioned in the Y-direction in front of horizontal row 6 in response to carrier currents arranged in Gray code signals and picked up by one of two sets of pick up shoes, viz., shoes 60a, 60b and 60c or shoes 60d, 60e and 60f shown in FIGS. 5 and 16 and functioning in the following manner. Each set comprises three shoes arranged in spaced relation in vertical alignment and having an overall length slightly exceeding the length of each of conductors 1 through 7; and the respective shoes of the two sets are spaced in a horizontal direction to engage each conductor at the same time. It is noted that as corresponding middle shoes 60b and 60e engage spaced points along a horizontal axis of conductor 1, for example, in FIGS. 5 and 16, corresponding outer shoes 60a and 60d and 60c and 60f overlap the upper and lower edges, respectively, of the latter conductor. The middle shoes provide a coarse adjustment of the carriage relative to the respective storing space horizontal rows in FIG. 2 while the outer shoes effect a precise adjustment of the carriage relative thereto in the manner involving middle shoe 54b and outer shoes 54a and 54c as explained above.

Now, it is recalled that the carriage is to move initially from storing space 141 (i.e., column 14a and horizontal row 1) to storing space 34 (i.e., column 3a and horizontal row 4) with an empty fork for the purpose of picking up a load in the latter storing space as pick up push button 77 has been heretofore depressed. This means that pick up shoes 60a, 60b and 60c have been selected for operation while pick up shoes 60d, 60e and 60f assigned for operation to deposit a load in a storing space remain inactive. Middle shoe 60b picks up carrier current Gray code signals from successive conductors 1, 2, 3, etc., as shoes 60a, 60b and 60c are engaged therewith during the Y-vertical movement of the carriage from horizontal row 1 toward horizontal row 4 under control of energized motor 37 in the manner explained above. During this time, it is understood that motor 37 attains full speed under control of the stacker computer to drive the carriage at full speed until the carriage reaches a predetermined distance from its ultimate destination which is horizontal row 4 for the purpose of this explanation.

From such predetermined distance to its ultimate destination, the speed of the carriage is gradually reduced from its full speed to a predetermined low speed when the stacker computer provides a difference, for example, of one volt between the signal voltage picked up by middle shoe 60b and the voltage signal picked up by one of outer shoes 60a and 60c. At this point, which is approximately a distance equal to the height of 1½ storing spaces from the desired stopping space, i.e., approximately at the middle of horizontal row 2 relative to horizontal row 4, the control of the carriage speed is automatically transferred at the stacker computer from middle shoe 60b to outer shoes 60a and 60c for the precise adjustment of the carriage speed via motor 37 to stop the carriage at its ultimate destination. At least one shoe of each set 60a, 60b and 60c and 60d 60e and 60f must always engage at least one of successive vertical conductors 1 through 7 in FIGS. 4 and 5. As a consequence, the length of the electric contact surface of each shoe of the two sets is greater than the distance between the ends of adjacent conductor in the manner of the similar shoes shown in FIG. 9.

When shoe 60b straddles the distance between the ends of adjacent conductor 1 through 7, the carrier current code signal picked up therefrom is effectively the signal applied to one of the straddled conductors. It is thus apparent in FIGS. 4, 5 and 16 that shoe 60b may pick up the signals effective on both conductors straddled thereby at the moment. As the signals in adjacent conductors differ in design by one carrier current, shoe 60b, therefore, picks up the highest number of carrier currents applied to one of the two straddled conductors, and the number of carrier currents included in the Gray code signal picked up by shoe 60b represents such one conductor. The stacker computer control of the speed of motor 37 and carriage 40 in FIG. 1 is so designed that the low speed thereof is approximately attained as point P on the carriage arrives approximately at the midpoint of vertical conductor 4 as shown in FIG. 17, the latter midpoint being substantially the midpoint of horizontal row 4 as explained hereinafter. The carriage point P is stopped precisely at the midpoint of conductor 4 when all shoes 60a, 60b and 60c pick up the carrier current Gray code signal (110 digits) which is effective on conductor 4 to represent horizontal row 4 as illlustrated in FIGS. 4, 5 and 16 for the purpose of this description. The accuracy of the final position of the carriage point P is determined by the stacker computer in response to the signals picked up by shoes 60a and 60c corresponding with the signals picked up by shoes 54a and 54c, respectively, and functioning essentially in the manner of pick up shoes 54a, 54b and 54c hereinbefore explained for the precise horizontal positioning of the stacker as shown in FIG. 9. It is thus evident in FIG. 17 that load handling fork 43 is initially positioned a predetermined distance say, for example, one inch below the pallet 22 in FIG. 2, is thereafter moved up in the Y-vertical direction to engage the under surface of pallet 22 in response to the stacker computer energizing motor 37, and is finally moved up in the Y-vertical direction a second predetermined distance say, for example, another one inch to permit pallet 22 to clear transverse support members 21, 21, as shown in FIG. 2.

In the case of the operation of FIG. 4 for a load deposit pick up shoes 60d, 60e and 60f in FIG. 16 are rendered operative in response to the depression of deposit push button 78 in FIG. 8 which pick up shoes 60a, 60b and 60c are held inactive as above mentioned. Pick up shoes 60d, 60e and 60f function to dispose carriage point D approximately opposite to the midpoint of conductor 4 in FIG. 18 essentially in the manner hereinbefore explained for the function of shoes 60a, 60b and 60c to dispose carriage point D precisely opposite to the midpoint of segment 6 as later explained. This means that the load handling fork containing a load, not shown, is initially a predetermined distance say, for example, one inch above transverse support members 21, 21 in FIG. 2, is thereafter moved down in the Y-vertical direction to engage the under surface of pallet 22 with the latter members, and finally moved down another predetermined distance say, for example, one inch to permit the fork to clear the under surface of pallet 22. Thus, it is evident that the load handling fork is moved the same distance in opposite directions for the pick up and deposit operations, and is thereby provided with a two inch stroke for the purpose of this description. From the foregoing description, it is understood that when motor 41 was energized to extend the empty load handling fork into the interior of storing space 34 for the load pick up function, carriage point P in FIG. 17 was disposed precisely opposite to the midpoint of horizontal conductor 4 thereby enabling the carriage to move up in the Y-vertical direction to cause the fork to pick up pallet 22 and load 23 thereon and thereafter lift pallet 22 clear of transverse support member 21, 21, in FIG. 2. It is also understood that when motor 41 was energized to extend the loaded load handling fork into the interior of storing space 126 for the load deposit function, carriage point D in FIG. 18 was disposed precisely opposite to the midpoint of horizontal conductor 6 thereby permitting the carriage to move down in the Y-vertical direction to cause the fork to deposit pallet 22 and load 23 thereon onto transverse support members 21, 21, and thereafter move farther down in the latter direction to disengage the fork from the pallet.

The system in FIG. 4 includes certain command operational signals transmitted from the central computer to the stacker computer and comprising carrier currents T and U in FIG. 7 positioned as the 1 digits in the Gray code signals for effecting predetermined operational functions at the stacker as shown in FIG. 14, and also includes other operational signals transmitted from the stacker computer to the central computer and comprising carrier currents V, W and # in FIG. 7 disposed as the 1 digits in the Gray code signals for achieving predetermined operational functions at the push button control panel in FIG. 7 as illustrated in FIG. 15. It is understood that the several operational functions shown in FIGS. 14 and 15 are disclosed merely for the purpose of this explanation and further that these operational functions may be changed and others added thereto as given designs of FIG. 4 may require. For example, the central computer may ask the stacker computer the question "Is Stacker Empty?" — via an appropriate carrier current Gray code signal as shown in FIG. 14 and the stacker computer may return the answer — "Stacker Empty" — via an appropriate carrier current Gray code signal illustrated in FIG. 15 and sent back by the stacker computer to the central computer. This answer causes the illumination of "Stacker Empty" push button 96 of the push button control panel. On the other hand and in response to the last-mentioned central computer question, the stacker computer may reply — "Stacker Loaded"— via appropriate carrier current Gray code signal shown in FIG. 15 and transmitted back from the stacker computer to the central computer for causing the illumination of "Load on Stacker " push button 95 on the push button control panel. In a similar manner other carrier current Gray code signals may be interchanged between the central and stacker computers for effecting particular commands thereat and specific responses thereto.

While the foregoing explanation is confined to the pick up and deposit of loads in specific load storing spaces located on the same side of an aisle of load storing spaces, it is obvious that pick ups and deposits of loads may also be interchangeably made on the opposite sides of such aisle in a similar manner. For this purpose, the storing space columns may be identified with odd numbers 1, 3, 5, etc., on one side of the aisle and even numbers 2, 4, 6, etc., on the opposite side of the aisle. In this way, the initial Z-transverse direction movement of the load handling fork, i.e., to a storing space on the odd or even numbered side of the aisle, may be included in a storing space number limited to one side of the aisle. Thus, a particular storing space address would automatically identify the odd or even numbered side of the aisle. It is understood that while the carrier current signals are transmitted via wire circuits, it is obvious that such signals may be also transmitted by radio circuits and other suitable signal transmission media.

It is understood that the invention herein is described in specific respects for the purpose of this description. It is also understood that such respects are merely illustrative of the application of the invention. Numerous other arrangements may be devised by those skilled in the art without departing from the spirit and scope of the invention.

What is claimed is:

1. Automatic warehouse apparatus, comprising:

a support containing a plurality of intersecting adjacent columns and horizontal rows of storing spaces, each common to one intersecting column and row;

a plurality of first electric conductor means, each positioned in proximity of one of said storing space columns;

a load stacker movable in a horizontal direction in front of each of said first conductors and corresponding storing space columns;

first signal pickup means mounted on said stacker to slidably engage, portions of each said first electrode conductor means in turn;

a plurality of second electric conductor means mounted on said stacker, each positioned in relation to one of said storing space horizontal rows;

a carriage mounted on said stacker and movable in a vertical direction thereon in front of each of said second conductors and corresponding storing space horizontal row;

second signal pickup means mounted on said carriage to slidably engage each of said second conductors in turn;

computer means mounted on said stacker;

a load handling fork movable on said carriage to extend into the interior of each of said storing spaces one at a time and to retract therefrom in a direction transverse to said carriage vertical movement;

means for continuously generating a plurality of different carrier currents;

first circuit means for continuously transmitting certain of said different currents from said generating means to said plurality of first electrical conductor means including one current indicating horizontal movement and other currents arranged in 1 digit positions of different 4-element Gray code signals, each transmitted to one of said first electrical conductor means for identifying the corresponding storing space column;

second circuit means for continuously transmitting additional of said different currents from said generating means to said second electrical conductor means including one current indicating vertical movement and other currents arranged in 1 digit positions of different 3-element Gray code signals, each transmitted to one of said second electrical conductor means for identifying the corresponding storing space horizontal row;

means for preselecting a predetermined load action of said fork at a preselected storing space formed by preselecting one intersecting storing space column and horizontal row; said preselecting means actuating said generating means to transmit therefrom on said second circuit means to said computer means a carrier current command signal including in sequence a carrier current indicating an outgoing signal, a carrier current indicating horizontal movement, a carrier current indicating vertical movement, a carrier current indicating transverse movement, a preselected one of said 4-element Gray codes identifying a preselected storing space column, a preselected one of said 3-element Gray codes for identifying a preselected storing space horizontal row, and further carrier currents arranged in 1 digit positions of two different 2-element Gray code signals, one indicating fork movement from said carriage to the interior of said preselected storing space and the other indicating fork movement from the interior of said last-mentioned storing space back to said carriage in sequence.

said computer means responsive to said outgoing and horizontal direction signal currents derived from said second circuit means and said horizontal direction signal current picked up by said first signal pickup means engaging one of said first electrical conductor means for comparing said 4-element code signals picked up one at a time by said first signal pickup means from said first electrical conductor means with said preselected 4-element code signal derived from said second circuit means to move said stacker in said horizontal direction in front of said storing space columns so long as said 4-element code signals picked up one at a time by said first pickup means from said first electrical conductor means are different from said last-mentioned preselected 4-element code signal, said computer means stopping said stacker in front of one of said portions of first electrical conductor means and corresponding storing space column identified by said last-mentioned preselected 4-element code signal when said 4-element code signal picked up from said last-mentioned one first electrical conductor means by said first pickup means is identical with said last-mentioned preselected 4-element code signal.

said computer means further responsive to said outgoing and vertical direction signal currents derived from said second circuit means and said vertical direction signal current picked up by said second signal pickup means engaging one of said second electrical conductor means for comparing said 3-element code signals picked up one at a time from said second electrical conductor means with said preselected 3-element code signal derived from said second circuit means to move said carriage in said vertical direction in front of said storing space horizontal rows so long as said 3-element code signals picked up one at a time by said second pickup means from said second electrical conductor means are different from said last-mentioned 3-element code signal, said computer means stopping said carriage in front of one of said second electrical conductor means and corresponding storing space horizontal row identified by said last-mentioned preselected 3-element code signal when said 3-element code signal picked up from said last-mentioned one second electrical conductor means by said second pickup means is identical with said last-mentioned 3-element code signal; said storing space column and horizontal row at which said stacker and carriage, respectively, are stopped forming said preselected storing space;

said computer means additionally responsive to said outgoing and transverse movement signal currents and one 2-element code signals to extend said fork from said carriage into the interior of said preslected storing space and therafter responsive to said other 2-element code signal to retract said fork from the interior of said last-mentioned storing space back to said carriage in response to said last-mentioned other 2-element code signal, said computer means programmed to actuate said fork in said predetermined load action in a time between said last-mentioned one and other 2-element code signals while said fork is in the interior of said pre-selected storing space;

said first signal pickup means comprising a plurality of pickup shoes horizontally aligned to overlap each of said first electrical conductor means in slidable engagement therewith, said pickup shoes slidably engaging adjacent first portions of said electrical conductor means to pick up said 4-element code signals therefrom, said computer means responsive to said last-mentioned signals for moving said stacker in said horizontal direction in front of said storing space columns, said computer means responsive to said 4-element code signal picked up by said shoes and preselected code signal when said shoes are stopped on said portion of said first electrical conductor means from which said picked up 4-element code signal is identical with said preselected 4-element code signal to stop said stacker in front of said storing space column corresponding with said last-mentioned portion of said one first electrical conductor means; and said plurality of pickup shoes including at least three horizontally spaced pickup shoes of which a middle shoe engages a middle portion of each portion of said first electrical conductor means and outer shoes overlap opposite ends thereof, said middle shoe and one outer shoe engaging each portion of said first electrical conductor means and the other outer shoe engaging an adjacent portion of said first electrical conductor means to pick up said 4-element code signals from both latter electrical conductor means, said computer means responsive to said 4-element code signals picked up one at a time by said middle shoe from said first electrical conductor means to move said stacker at one rate of speed in the horizontal direction in front of said storing space columns to dispose a preselected point on said stacker approximately opposite to a preselected point on said portion of said first electrical conductor means from which said picked up 4-element code signal is identical with said preselected code signal, said computer means responsive to said preselected 4-element code signal and a 4-element code signal picked up by one of said outer shoes from a first electrical conductor means adjacent to said last-mentioned first electrical conductor means to move said stacker at a rate of speed different from said last-mentioned one speed rate for stopping said stacker preselected point precisely opposite to said last-mentioned first electrical conductor means from which said picked up 4-element code signal is identical with said preselected 4-element code signal.

2. Automatic warehouse apparatus, comprising:

a support containing a plurality of intersecting adjacent columns and horizontal rows of storing spaces, each common to one intersecting column and row;

a plurality of first electric conductor means, each positioned in proximity of one of said storing space columns;

a load stacker movable in a horizontal direction in front of each of said first conductors and corresponding storing space columns;

first signal pickup means mounted on said stacker to slidably engage, portions of each of said first electric conductor means in turn;

a plurality of second electric conductor means mounted on said stacker, each positioned in relation to one of said storing space horizontal rows;

a carriage mounted on said stacker and movable in a vertical direction thereon in front of each of said second conductors and corresponding storing space horizontal row;

second signal pickup means mounted on said carriage to slidably engage each of said second conductors in turn;

computer means mounted on said stacker;

a load handling fork movable on said carriage to extend into the interior of each of said storing spaces one at a time and to retract therefrom in a direction transverse to said carriage vertical movement;

means for continuously generating a plurality of different carrier currents;

first circuit means for continuously transmitting certain of said different currents from said generating means to said plurality of first electrical conductor means including one current indicating horizontal movement and other currents arranged in 1 digit positions of different 4-element Gray code signals, each transmitted to one of said first electrical conductor means for identifying the corresponding storing space column;

second circuit means for continuously transmitting additional of said different currents from said generating means to said second electrical conductor means including one current indicating vertical movement and other currents arranged in 1 digit positions of different 3-element Gray code signals, each transmitted to one of said second electrical conductor means for identifying the corresponding storing space horizontal row;

means for preselecting a predetermined load action of said fork at a preselected storing space formed by preselecting one intersecting storing space column and horizontal row; said preselecting means actuating said generating means to transmit therefrom on said second circuit means to said computer means a carrier current command signal including in sequence a carrier current indicating an outgoing signal, a carrier current indicating horizontal movement, a carrier current indicating vertical movement, a carrier current indicating transverse movement, a preselected one of said 4-element Gray codes identifying a preselected storing space column, a preselected one of said 3-element Gray codes for identifying a preselected storing space horizontal row, and further carrier currents arranged in 1 digit positions of two different 2-element Gray code signals, one indicating fork movement from said carriage to the interior of said preselected storing space and the other indicating fork movement from the interior of said last-mentioned storing space back to said carriage in sequence;

said computer means responsive to said outgoing and horizontal direction signal currents derived from said second circuit means and said horizontal direction signal current picked up by said first signal pickup means engaging one of said first electrical conductor means for comparing said 4-element code signals picked up one at a time by said first signal pickup means from said first electrical conductor means with said preselected 4-element code signal derived from said second circuit means to move said stacker in said horizontal direction in front of said storing space columns so long as said 4-element code signals picked up one at a time by said first pickup means from said first electrical conductor means are different from said last-mentioned preselected 4-element code signal, said computer means stopping said stacker in front of one of said portions of first electrical conductor means and corresponding storing space column identified by said last-mentioned preselected 4-element code signal when said 4-element code signal picked up from said last-mentioned one first electrical conductor means by said first pickup means is identical with said last-mentioned preselected 4-element code signal said computer means further responsive to said outgoing and vertical direction signal currents derived from said second circuit means and said vertical direction signal current picked up by said second signal pickup means engaging one of said second electrical conductor means for comparing said 3-element code signals picked up one at a time from said second electrical conductor means with said preselected 3-element code signal derived from said second circuit means to move said carriage in said vertical direction in front of said storing space horizontal rows so long as said 3-element code signals picked up one at a time by said second pickup means from said second electrical conductor means are different from said last-mentioned 3-element code signal, said computer means stopping said carriage in front of one of said second electrical conductor means and corresponding storing space horizontal row identified by said last-mentioned preselected 3-element code signal when said 3-element code signal picked up from said last-mentioned one second electrical conductor means by said second pickup means is identical with said last-mentioned 3-element code signal; said storing space column and horizontal row at which said stacker and carriage, respectively, are stopped forming said preselected storing space;

said computer means additionally responsive to said outgoing and transverse movement signal currents and one 2-element code signals to extend said fork from said carriage into the interior of said preselected storing space and thereafter responsive to said other 2-element code signal to retrack said fork from the interior of said last-mentioned storing space back to said carriage in response to said last-mentioned other 2-element code signal, said computer means programmed to actuate said fork in said predetermined load action in a time between said last-mentioned one and other 2-element code signals while said fork is in the interior of said pre-selected storing space; and said second signal pickup means comprising two groups of slidable pickup shoes, each group comprising three horizontally spaced shoes of which a middle shoe engages substantially a midpoint of each of said second electrical conductor means and outer shoes disposed on opposite sides of said middle shoe partly engage each second electrical conductor means on opposite sides of said middle shoe and at the same time partly overlap opposite edges of said last-mentioned electrical conductor means, said computer means is responsive to said preselected 3-element codes signal and a 3-element code signal picked up by one of said two shoe groups from one of said second electrical conductor means to stop a preselected one of two vertically spaced points on said carriage opposite to a preselected point on one of said second electrical conductor means when said 3-element code signal picked up from said last-mentioned one second electrical conductor means is identical with said preselected 3-element code signal.

3. Automatic warehouse apparatus, comprising:

a support containing a plurality of adjacent columns and rows of storage locations wherein each storage location is adapted to receive material to be stored;

a plurality of electrical conductor means mounted on said support and disposed in relation to said plurality of adjacent columns of storage locations in said support, each of said plurality of electrical conductor means including a portion from which information applied to a given electrical conductor means may be derived, each of said plurality of electrical conductor means having the portion thereof from which information may be derived positioned in relation to an individual one of said plurality of adjacent columns of storage locations in such manner that one of said plurality of electrical conductor means is associated with each column of storage locations;

first means for applying a plurality of carrier information signals to said plurality of electrical conductor means according to a predetermined coding sequence, said carrier information signals serving to separately identify each of said plurality of electrical conductor means and hence the column of storage locations associated therewith, said plurality of carrier information signals applied according to a predetermined coding sequence by said first means comprising multi-element digital code signals indicating a horizontal direction of movement and identifying each column of storage locations, one carrier current indicating said horizontal direction of movement and others arranged in 1 digit positions of different 4-element Gray code signals, each applied to one of said plurality of electrical conductor means to identify a corresponding column of storage locations;

stacker means movable in front of said plurality of adjacent columns of storage locations in a direction transverse thereto, said stacker means including a carriage movable thereon in front of said rows of storage locations in a direction transverse thereto and lift fork means mounted on said carriage, said stacker means being adapted to derive information from said portions of individual ones of said plurality of electrical conductor means associated with each column of storage locations;

an additional plurality of electrical conductor means mounted on said stacker means and disposed in relation to said plurality of adjacent rows of storage locations, each of said additional plurality of electrical conductor means having a portion from which information applied to a given electrical conductor means may be derived, each of said additional plurality of electrical conductor means having the portion thereof from which information may be derived positioned in relation to an individual one of said plurality of adjacent rows of storage locations in such manner that one of said plurality of electrical conductor means is associated with each row of storage locations;

second means for applying additional carrier information signals to said stacker means, said additional carrier information signals including at least a signal designating a selected one of said plurality of columns of storage locations, said second means for applying additional carrier information signals to said stacker means also applying a further plurality of carrier information signals to said additional plurality of electrical conductor means according to a preselected coding sequence, said further carrier information signals serving to separately identify each of said additional plurality of electrical conductor means and hence the row of storage locations associated therewith, said second means for applying additional carrier information signals to said stacker means also applying carrier information signals including at least a signal designating a selected one of said plurality of rows of storage locations, said further plurality of carrier information signals also applied according to a preselected coding sequence by said second means to said additional plurality of electrical conductor means comprising multi-element digital code signals indicating a vertical direction of movement and identifying each row of storage locations, said plurality of further carrier information signals comprising one carrier current indicating said vertical direction of movement and others arranged in 1 digit positions of different 3-element Gray code signals, each applied to one of said additional plurality of electrical conductor means to identify a corresponding row of storage locations;

means mounted on said stacker means for comparing said signal designating a selected one of said plurality of columns with carrier information signals derived from said portions of individual ones of said plurality of electrical conductor means and identifying the column of storage locations associated therewith, said means mounted on said stacker means enabling the movement of said stacker means in said transverse direction so long as said signals compared thereby differ and stopping the motion of said stacker means when an identity between the signals compared is obtained, said stacker means being further adapted to derive information from said portions of individual ones of said additional plurality of electrical conductor means associated with each row of storage locations, said means for comparing mounted on said stacker means also comparing said signal designating a selected one of said plurality of rows with carrier information signals derived from said portions of individual ones of said additional plurality of electrical conductor means and designating the row of storage locations associated therewith, said means mounted on said stacker means enabling the movement of said carriage means in said transverse row direction so long as said carrier information signals compared thereby differ and stopping the motion of said carriage means when an identity between the signals compared is obtained; and means mounted on said stacker means for slidably engaging said portions of said plurality of electrical conductor means and said additional plurality of electrical conductor means from which information may be derived and applying the information derived therefrom to said means for comparing, said slidably engaging means including a plurality of spaced first pickup means slidably engaging said portions of said plurality of electrical conductor means mounted on said support for deriving code signals sequentially therefrom and applying said code signals to said means for comparing to control the movement of said stacker means, said plurality of spaced first pickup means including at least one pickup means for engaging said portion of one of said plurality of electrical conductor means and another pickup means for engaging said portion of an adjacent one of said plurality of electrical conductor means, and a plurality of spaced second pickup means slidably engaging said portions of said additional plurality of electrical conductor means mounted on said stacker means for deriving code signals sequentially therefrom and applying said code signals to said means for comparing to control the movement of said carriage, said plurality of spaced second pickup means including at least one pickup means for engaging said portion of one of said additional plurality of electrical conductor means and another pickup means for engaging said portion of an adjacent one of said additional plurality of electrical conductor means, said plurality of spaced first pickup means including at least three shoes spaced in a horizontal plane and slidable on said portions of said plurality of conductor means for deriving said code signals one at a time therefrom, said means for comparing utilizing said code signals derived one at a time by a middle one of said shoes from said portions of said plurality of conductor means for moving said movable means at one rate of speed in front of said columns of storage locations to dispose a preselected point on said stacker means in the vicinity of a preselected point on said portion providing said code signal identical with a signal designating a selected one of said plurality of columns of storage locations, said comparing means thereafter utilizing said code signals derived one at a time by one of two outer of said shoes from said portions to move said movable means at a rate of speed different from said one speed rate for stopping said preselected point on said movable means precisely opposite to said preselected point on said last-mentioned portion.

4. Automatic warehouse apparatus, comprising:

a support containing a plurality of adjacent columns of storage locations, and wherein each storage location is adapted to receive material to be stored;

a plurality of electrical conductor means mounted on said support and disposed in relation to said plurality of adjacent columns of storage locations in said support, each of said plurality of electrical conductor means including a portion from which information applied to a given electrical conductor means may be derived, each of said plurality of electrical conductor means having the portion thereof from which information may be derived positioned in relation to an individual one of said plurality of adjacent columns of storage locations in such manner that one of said plurality of electrical conductor means is associated with each column of storage locations;

first means for applying a plurality of carrier information signals to said plurality of electrical conductor means according to a predetermined coding sequence, said carrier information signals serving to separately identify each of said plurality of electrical conductor means and hence the column of storage locations associated therewith, said plurality of carrier information signals comprising multi-element code signals indicating a horizontal direction of movement and identifying each column of storage locations, said multi-element code signals applied by said first means to each of said plurality of electrical conductor means including one carrier current indicating said horizontal direction of movement and others arranged in 1 digit positions of different 4-element Gray code signals, each applied to one of said plurality of electrical conductor means to identify a corresponding column of storage locations;

stacker means movable in front of said plurality of adjacent columns of storage locations in a direction transverse thereto, said stacker means being adapted to derive information from said portions of individual ones of said plurality of electrical conductor means associated with each column of storage locations;

second means for applying additional carrier information signals to said stacker means, said additional carrier information signals including at least a signal designating a selected one of said plurality of columns of storage locations said signal designating a selected one of said plurality of columns of storage locations applied by said second means to said stacker means comprising multi-element code signals identifying a selected column of storage locations;

means mounted on said stacker means for comparing said signal designating a selected one of said plurality of columns with carrier information signals derived from said portions of individual ones of said plurality of electrical conductor means and identifying the column of storage locations associated therewith, said means mounted on said stacker means enabling the movement of said stacker means in said transverse direction so long as said signals compared thereby differ and stopping the motion of said stacker means when an identity between the signals compared is obtained; and means mounted on said stacker means for slidably engaging said portions of said plurality of electrical conductor means, said slidably engaging means comprising a plurality of spaced pickup means slidably engaging said portions of said plurality of electrical conductor means mounted on said support for deriving code signals sequentially therefrom and applying said code signals to said means for comparing to control the movement of said stacker means, said plurality of spaced first pickup means including at least one pickup means for engaging said portion of one of said plurality of electrical conductor means and another pickup means for engaging said portion of an adjacent one of said plurality of electrical conductor means, said plurality of spaced first pickup means including at least three shoes spaced in a horizontal plane and slidable on said portions of said plurality of conductor means for deriving said code signals one at a time therefrom, said means for comparing utilizing said code signals derived one at a time by a middle one of said shoes from said portions of said plurality of conductor means for moving said movable means at one rate of speed in front of said columns of storage locations to dispose a preselected point on said stacker means in the vicinity of a preselected point on said portion providing said code signal identical with a signal designating a selected one of said plurality of columns of storage locations, said comparing means thereafter utilizing said code signals derived one at a time by one of two outer of said shoes from said portions to move said movable means at a rate of speed different from said one speed rate for stopping said preselected point on said movable means precisely opposite to said preselected point on said last-mentioned portion.

5. The automatic warehouse apparatus according to claim 3 wherein said first means for applying a plurality of carrier information signals to said plurality of electrical conductor means according to a predetermined coding sequence includes means for generating carrier currents at each of a plurality of outputs wherein said carrier current generated at each of said plurality of outputs differs in frequency and means for connecting a plurality of outputs to each of said plurality of electrical conductor means in a predetermined manner so that a differing multi-element code is applied to each of said plurality of electrical conductor means.

6. The automatic warehouse apparatus according to claim 4 wherein said first means for applying a plurality of carrier information signals to said plurality of electrical conductor means according to a predetermined coding sequence includes means for generating carrier currents at each of a plurality of outputs wherein said carrier current generated at each of said plurality of outputs differs in frequency and means for connecting a plurality of outputs to each of said plurality of electrical conductor means in a predetermined manner so that a differing multi-element code is applied to each of said plurality of electrical conductor means.

* * * * *

UNITED STATES PATENT OFFICE
CERTIFICATE OF CORRECTION

Patent No. 3,968,888              Dated July 13, 1976

Inventor(s) WILLIAM GEORGE VAN VLIET      Page 1 of 2

It is certified that error appears in the above-identified patent and that said Letters Patent are hereby corrected as shown below:

IN THE SPECIFICATION:

IN THE TITLE - "SYSEM" should be --SYSTEM--;
Column 2, line 50, after "therein" delete the period (".");
Column 3, line 50, after "conductor" insert --3--;
Column 10, line 27, "laod" should be --load--;
Column 11, line 21, "valves" should be --values--;
            line 46, "ths" should be --the--;
Column 13, line 35, delete "1a" and insert --carrier--;
Column 14, line 28, "segments" should be --conductor--;
Column 15, line 25 "cmprises" should be --comprises--;
Column 16, line 65, "dispostal" should be --disposal--;
Column 19, line 4, "insturctions" should be --instructions--;
            line 11, "respectivelly" should be --respectively--;
            line 52, after "88" insert --a-- (88a);
Column 20, line 13, "FIIG" should be --FIG--;
            line 27, "applied" should be --applies--;
            line 30, "applied" should be --applies--;
Column 22, line 15, "differene" should be --difference--;
            line 38, "indicte" should be --indicate--;
Column 23, line 46, "tacker" should be --stacker--;
            line 68, "74" should be --74a--;
Column 24, line 58, delete "and" second occurrence;
Column 27, line 62, "a" should be --at--;
Column 28, line 44, "segment" should be --conductor--;
Column 29, line 64, after "start" insert --reading--;
Column 30, line 24, "spaced" should be --spaces--;
Column 31, line 19, "diifference" should be --difference--;
            line 40, delete "aa" and insert --a--;

UNITED STATES PATENT OFFICE
CERTIFICATE OF CORRECTION

Patent No. 3,968,888            Dated July 13, 1976

Inventor(s) WILLIAM GEORGE VAN VLIET     Page 2 of 2

It is certified that error appears in the above-identified patent and that said Letters Patent are hereby corrected as shown below:

Column 37, line 12 and 13, "preslected" should be --preselected--;
            line 13, "therafter" should be --thereafter--.

Signed and Sealed this

Eighth Day of February 1977

[SEAL]

Attest:

RUTH C. MASON
*Attesting Officer*

C. MARSHALL DANN
*Commissioner of Patents and Trademarks*